(12) United States Patent
Hillebrand et al.

(10) Patent No.: US 9,891,038 B2
(45) Date of Patent: *Feb. 13, 2018

(54) METHOD FOR OPTICALLY MEASURING THREE-DIMENSIONAL COORDINATES AND CONTROLLING A THREE-DIMENSIONAL MEASURING DEVICE

(71) Applicant: FARO Technologies, Inc., Lake Mary, FL (US)

(72) Inventors: Gerrit Hillebrand, Waiblingen (DE); Rolf Heidemann, Stuttgart (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,714

(22) Filed: Jan. 19, 2017

(65) Prior Publication Data
US 2017/0131085 A1 May 11, 2017

Related U.S. Application Data

(63) Continuation of application No. 14/844,700, filed on Sep. 3, 2015, now Pat. No. 9,602,811, which is a (Continued)

(30) Foreign Application Priority Data

Sep. 10, 2014 (DE) .................. 10 2014 013 677
Sep. 10, 2014 (DE) .................. 10 2014 013 678
(Continued)

(51) Int. Cl.
*H04N 1/04* (2006.01)
*G01B 11/00* (2006.01)
(Continued)

(52) U.S. Cl.
CPC ........ G01B 11/002 (2013.01); G01B 11/2513 (2013.01); G06F 3/017 (2013.01);
(Continued)

(58) Field of Classification Search
CPC ........ G06F 3/011; G06F 13/16; G06F 3/0425; G06T 2207/10028; G06T 2207/30244;
(Continued)

(56) References Cited

U.S. PATENT DOCUMENTS 6,215,498 B1 * 4/2001 Filo .................. G06F 3/011
 345/419
7,259,747 B2 * 8/2007 Bell .................. G06F 3/011
 345/156
(Continued)

FOREIGN PATENT DOCUMENTS

AT 506110 A1 6/2009
DE 2950138 A1 6/1981
(Continued)

OTHER PUBLICATIONS

Creaform Metrology Solutions, "Handy Scan 3D—The Truly Portable Metrology-Grade 3D Scanners" brochure, 7 pages.
(Continued)

*Primary Examiner* — Negussie Worku
(74) *Attorney, Agent, or Firm* — Cantor Colburn LLP

(57) ABSTRACT

A method for scanning and obtaining three-dimensional (3D) coordinates is provided. The method includes providing a 3D measuring device having a projector, a first camera and a second camera. The method records images of a light pattern emitted by the projector onto an object. The 3D measuring device is moved from a first position and a second position along a second path. A gesture and a corresponding control function are determined based at least in part on the first position and the second position.

20 Claims, 18 Drawing Sheets

Related U.S. Application Data continuation-in-part of application No. 14/826,859, filed on Aug. 14, 2015, now Pat. No. 9,671,221, which is a continuation-in-part of application No. 14/712,993, filed on May 15, 2015, application No. 15/409,714, filed on Jan. 19, 2017, which is a continuation of application No. 14/844,700, filed on Sep. 3, 2015, now Pat. No. 9,602,811, which is a continuation-in-part of application No. 14/722,219, filed on May 27, 2015, now Pat. No. 9,769,463.

(60) Provisional application No. 62/161,461, filed on May 14, 2015.

(30) Foreign Application Priority Data

| | | | |
|---|---|---|---|
| Sep. 10, 2014 | (DE) | ............... | 10 2014 113 015 |
| May 2, 2015 | (DE) | ............... | 10 2015 106 836 |
| May 2, 2015 | (DE) | ............... | 10 2015 106 837 |
| May 2, 2015 | (DE) | ............... | 10 2015 106 838 |

(51) Int. Cl.
| | |
|---|---|
| G01B 11/25 | (2006.01) |
| H04N 13/02 | (2006.01) |
| G06F 3/01 | (2006.01) |
| G06K 9/00 | (2006.01) |
| H04N 13/00 | (2018.01) |
| G06K 9/22 | (2006.01) |

(52) U.S. Cl.
CPC ......... *G06K 9/00335* (2013.01); *G06K 9/22* (2013.01); *H04N 13/0055* (2013.01); *H04N 13/0242* (2013.01); *H04N 13/0257* (2013.01); *H04N 13/0296* (2013.01); *H04N 2013/0081* (2013.01)

(58) Field of Classification Search
CPC ..... G06T 15/00; G06T 17/00; G06T 2200/08; G06T 2207/10016; G06T 2207/10048; G06T 2207/20072; G06T 7/246; G06T 7/251
USPC ............... 345/156, 157, 158, 159, 419, 473; 348/E5.029, E5.09, 14.12, 14.13, 36; 700/214, 258, 8; 712/32; 715/751; 901/9
See application file for complete search history.

(56) References Cited

U.S. PATENT DOCUMENTS

| | | | | |
|---|---|---|---|---|
| 8,355,041 | B2* | 1/2013 | Chen | H04N 5/23238 348/14.12 |
| 8,937,657 | B2* | 1/2015 | Klass | G01B 11/254 348/136 |
| 9,196,067 | B1 | 11/2015 | Freed | |
| 9,242,171 | B2* | 1/2016 | Newcombe | A63F 13/06 |
| 9,372,265 | B2 | 6/2016 | Zweigle et al. | |
| 9,377,265 | B2* | 6/2016 | Marvin | |
| 9,383,587 | B2* | 7/2016 | Balogh | G02B 5/0257 |
| 9,596,067 | B2* | 3/2017 | Kim | H04L 5/0005 |
| 9,602,811 | B2* | 3/2017 | Hillebrand | G01B 11/245 |
| 9,671,221 | B2* | 6/2017 | Ruhland | G01B 11/2545 |
| 9,693,040 | B2* | 6/2017 | Hillebrand | G01B 21/042 |
| 9,769,463 | B2* | 9/2017 | Hillebrand | H04N 13/0296 |
| 2002/0015934 | A1* | 2/2002 | Rubbert | A61C 7/00 433/29 |
| 2007/0097381 | A1* | 5/2007 | Tobiason | G06T 7/521 356/604 |
| 2007/0171220 | A1* | 7/2007 | Kriveshko | A61C 13/0004 345/419 |
| 2007/0172112 | A1 | 7/2007 | Paley et al. | |
| 2008/0201101 | A1 | 8/2008 | Hebert et al. | |
| 2010/0034426 | A1 | 2/2010 | Takiguchi et al. | |
| 2010/0095542 | A1 | 4/2010 | Ferrari | |
| 2010/0134598 | A1 | 6/2010 | St-Pierre et al. | |
| 2010/0134599 | A1 | 6/2010 | Billert et al. | |
| 2010/0259636 | A1 | 10/2010 | Tzur et al. | |
| 2011/0107611 | A1 | 5/2011 | Desforges et al. | |
| 2011/0134225 | A1 | 6/2011 | Saint-Pierre et al. | |
| 2011/0164037 | A1 | 7/2011 | Yoshida et al. | |
| 2011/0181553 | A1 | 7/2011 | Brown et al. | |
| 2011/0188739 | A1 | 8/2011 | Lee et al. | |
| 2012/0033069 | A1 | 2/2012 | Becker et al. | |
| 2012/0062557 | A1 | 3/2012 | Dillon et al. | |
| 2012/0092461 | A1 | 4/2012 | Fisker et al. | |
| 2012/0236288 | A1 | 9/2012 | Stanley | |
| 2012/0327083 | A1 | 12/2012 | Nishimura et al. | |
| 2013/0155058 | A1 | 6/2013 | Golparvar-Fard et al. | |
| 2013/0218024 | A1 | 8/2013 | Boctor et al. | |
| 2013/0335417 | A1 | 12/2013 | McQueston et al. | |
| 2014/0015963 | A1 | 1/2014 | Klaas | |
| 2014/0028805 | A1 | 1/2014 | Tohme | |
| 2014/0120493 | A1 | 5/2014 | Levin | |
| 2014/0168370 | A1* | 6/2014 | Heidemann | G01B 11/2513 348/46 |
| 2014/0267623 | A1 | 9/2014 | Bridges et al. | |
| 2014/0268108 | A1 | 9/2014 | Grau | |
| 2015/0015701 | A1 | 1/2015 | Yu | |
| 2015/0229907 | A1 | 8/2015 | Bridges | |
| 2015/0373321 | A1 | 12/2015 | Bridges | |
| 2016/0069670 | A1 | 3/2016 | Ruhland et al. | |
| 2016/0073085 | A1 | 3/2016 | Hillebrand et al. | |
| 2016/0073091 | A1 | 3/2016 | Hillebrand et al. | |
| 2016/0073104 | A1 | 3/2016 | Hillebrand et al. | |

FOREIGN PATENT DOCUMENTS

| | | |
|---|---|---|
| DE | 19502459 A1 | 8/1996 |
| DE | 19637682 A1 | 3/1998 |
| DE | 10149750 A1 | 9/2002 |
| DE | 10219054 A1 | 11/2003 |
| DE | 10313223 A1 | 10/2004 |
| DE | 102007022361 A1 | 11/2008 |
| DE | 102010017857 A1 | 10/2011 |
| DE | 202012104890 U1 | 3/2013 |
| DE | 102011119012 A1 | 5/2013 |
| DE | 102012112322 A1 | 6/2014 |
| EP | 1882895 A1 | 1/2008 |
| EP | 2048557 B1 | 4/2009 |
| EP | 2428764 A1 | 3/2012 |
| EP | 2620914 A2 | 7/2013 |
| EP | 2693300 A2 | 2/2014 |
| EP | 2728306 A1 | 5/2014 |
| WO | 2005103863 | 11/2005 |
| WO | 2009003225 A1 | 1/2009 |
| WO | 2010015086 A1 | 2/2010 |
| WO | 2012079013 A1 | 6/2012 |
| WO | 2012168322 A2 | 12/2012 |
| WO | 2013184340 A1 | 12/2013 |
| WO | 2013186160 A1 | 12/2013 |

OTHER PUBLICATIONS

Creaform, "Creaform Releases Completely Re-Engineered Handyscan 3D Portable Scanners", May 5, 2014, 1 page.
Mahdy, Yousef B., et al; "Projector Calibration Using Passive Stereo and Triangulation"; International Journal of Future Computer and Communication; vol. 2; No. 5; 385-390; Oct. 2013; 6 pgs.
International Search Report and Written Opinion for Application No. PCT/US2015/048857 dated Nov. 30, 2015; 22 pages.
Hebert, P., "A Self-Referenced Hand-Held Range Sensor" Proceedings Third International Conference on 3-D Digital Imaging and Modeling, Quebec City, Que., 2001, pp. 5-12.
German Office Action for Application No. 10 2015 106 837.0 dated Jun. 21, 2017; 4pgs.

\* cited by examiner

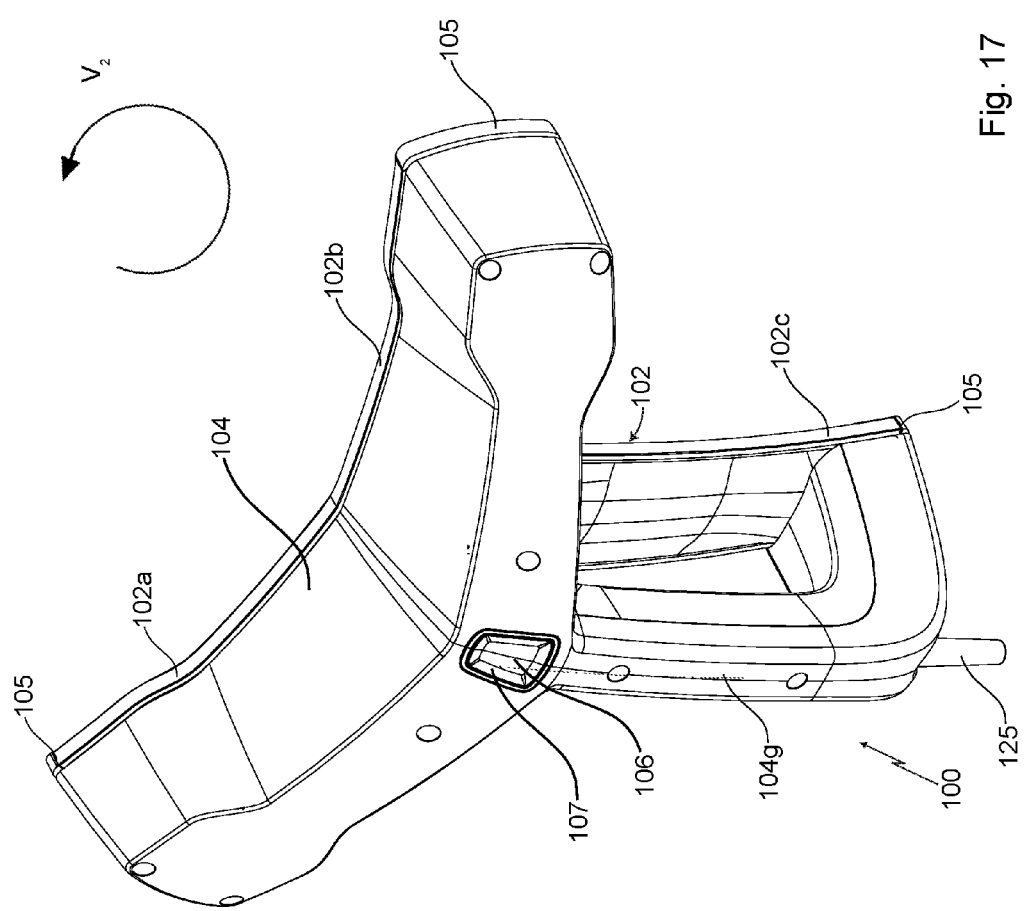

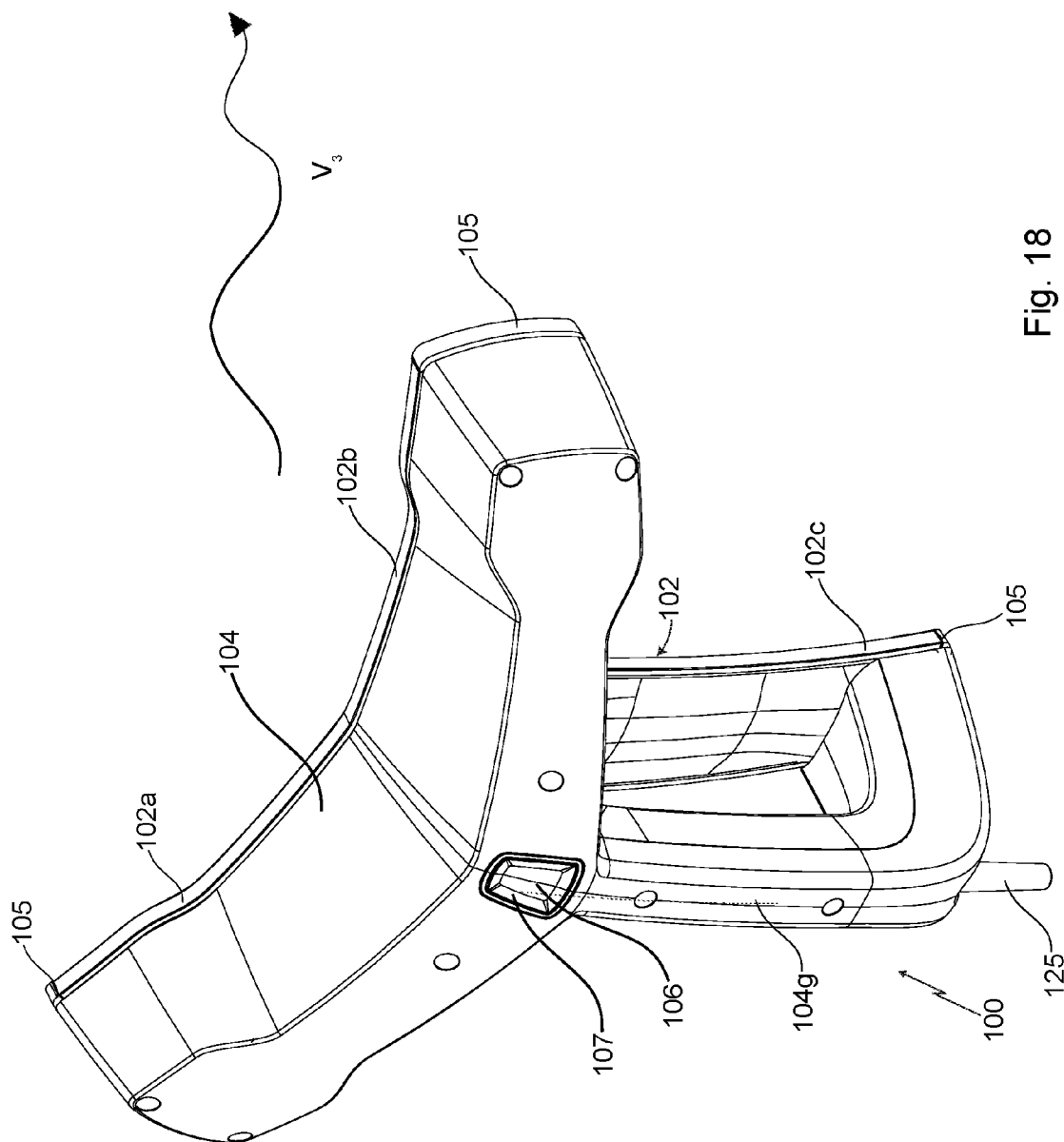

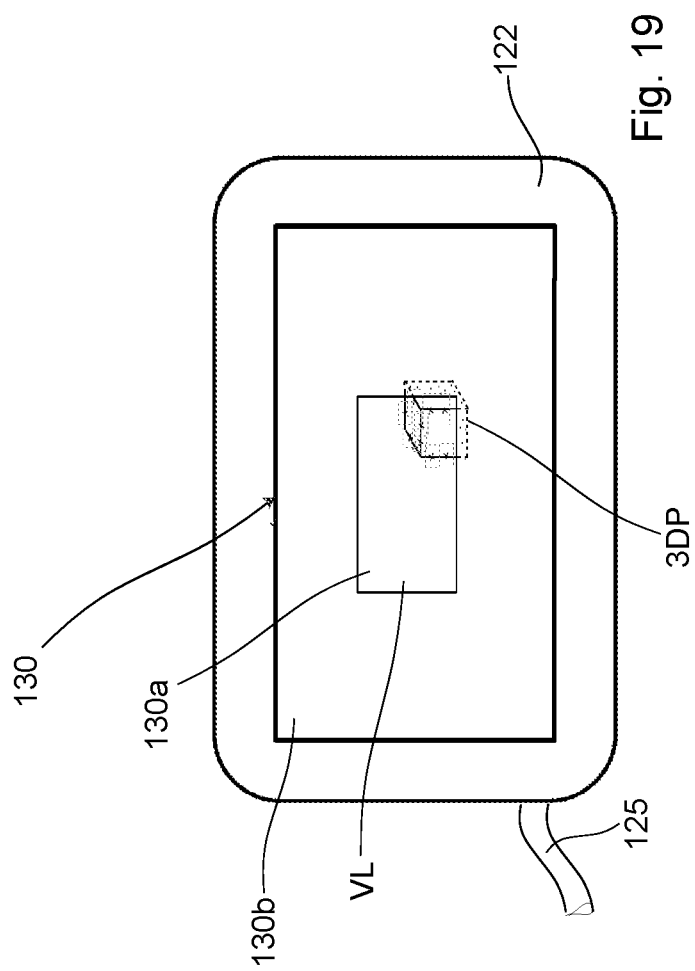

METHOD FOR OPTICALLY MEASURING THREE-DIMENSIONAL COORDINATES AND CONTROLLING A THREE-DIMENSIONAL MEASURING DEVICE

CROSS REFERENCE TO RELATED APPLICATIONS

The present application is a continuation application of U.S. application Ser. No. 14/844,700 filed on Sep. 3, 2015, which claims the benefit of German Patent Application 10 2015 106 836.2 filed on May 2, 2015, German Patent Application 10 2015 106 837.0 filed on May 2, 2015, and German Patent Application 10 2015 106 838.9 filed on May 2, 2015. The contents of all of which are incorporated by reference herein in their entirety.

The U.S. application Ser. No. 14/844,800 also a continuation-in-part application of U.S. application Ser. No. 14/826,859 filed on Aug. 14, 2015. U.S. Ser. No. 14/826,859 claims the benefit of German Patent Application 10 2014 113 015.4 filed on Sep. 10, 2014 and is also a continuation-in-part application of U.S. application Ser. No. 14/712,993 filed on May 15, 2015, which is a nonprovisional application of U.S. Provisional Application 62/161,461 filed on May 14, 2015. U.S. application Ser. No. 14/712,993 further claims the benefit of German Patent Application 10 2014 013 677.9 filed on Sep. 10, 2014. The contents of all of which are incorporated by reference herein in their entirety.

The present application is further a continuation-in-part application of U.S. application Ser. No. 14/722,219 filed on May 27, 2015, which is a nonprovisional application of the aforementioned U.S. Provisional Application 62/161,461. U.S. Ser. No. 14/722,219 claims the benefit of German Application 10 2014 013 678.7 filed on Sep. 10, 2014. The contents of all of which are incorporated by reference herein in their entirety.

BACKGROUND

The subject matter disclosed herein relates to a portable scanner, and in particular to a portable scanner having a display.

A portable scanner includes a projector that projects light patterns on the surface of an object to be scanned. The position of the projector is determined by means of a projected, encoded pattern. Two (or more) cameras, the relative positions and alignment of which are known or are determined, can record images of the surface with a further, uncoded pattern. The three-dimensional coordinates (of the points of the pattern) can be determined by means of mathematical methods which are known per se, such as epipolar geometry.

In video gaming applications, scanners are known as tracking devices, in which a projector projects an encoded light pattern onto the target to be pursued, preferably the user who is playing, in order to then record this encoded light pattern with a camera and to determine the coordinates of the user. The data are represented on an appropriate display.

A system for scanning a scene, including distance measuring, may include, in its most simplest form, a camera unit with two cameras, and illumination unit and a synchronizing unit. The cameras, which may optionally include filters, are used for the stereoscopic registration of a target area. The illumination unit is used for generating a pattern in the target area, such as by means of a diffractive optical element. The synchronizing unit synchronizes the illumination unit and the camera unit. Camera unit and illumination unit can be set up in selectable relative positions. Optionally, also two camera units or two illumination units can be used.

BRIEF DESCRIPTION OF THE INVENTION

According to one aspect of the invention, a method for optically scanning and measuring an environment is provided. The method comprising: providing a three-dimensional (3D) measurement device having a first camera, a second camera and a projector, the 3D measurement device further having a control and evaluation device operably coupled to the at least one camera and the projector, the control and evaluation device having memory; providing a rule of correspondence between each of a plurality of commands and each of a plurality of gestures, each gesture from among the plurality of gestures including a movement along a path by the 3D measurement device, the rule of correspondence based at least in part on the movement along a first path, the rule of correspondence being stored in the memory; emitting a light pattern onto an object with the projector; recording a first set of images of the light pattern with the first camera and the second camera at a first time; recording a second set of images of the light pattern with the first camera and the second camera at a second time; producing a 3D scan of the object based at least in part on the first image and the second image; moving the 3D measuring device along a second path from a first position to a second position; determining a gesture based at least in part on the movement from the first position to the second position; determining a first control function based at least in part on the gesture and the rule of correspondence; and executing the first control function on the 3D measurement device.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 17 shows a second group of movements with the 3D measuring device;

FIG. 18 shows a third group of movements with the 3D measuring device; and

FIG. 19 shows a top view on the control and evaluation device from FIG. 7 with a modified scale on the display.

Figure 1:
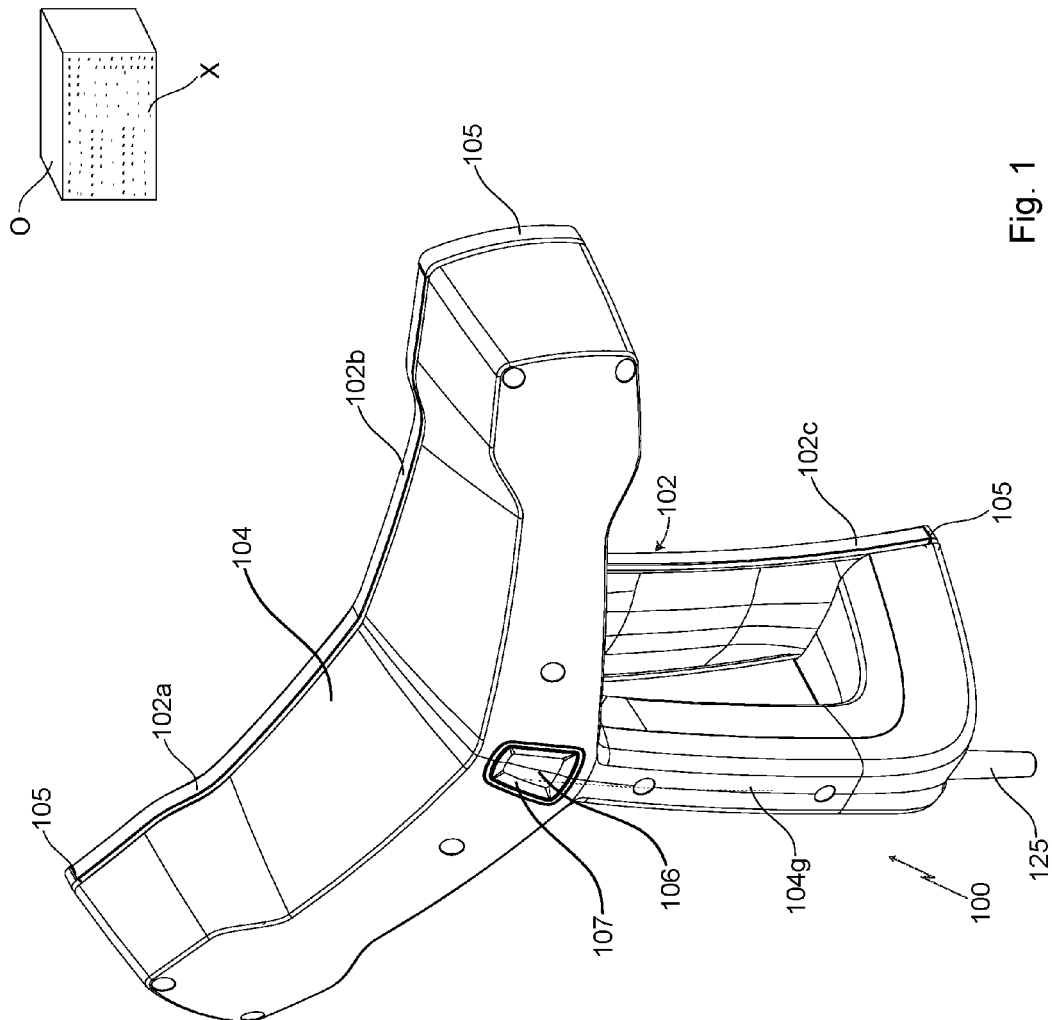
FIG. 1 shows a perspective view of a hand-held scanner and of an object in the environment.
Figure 2:
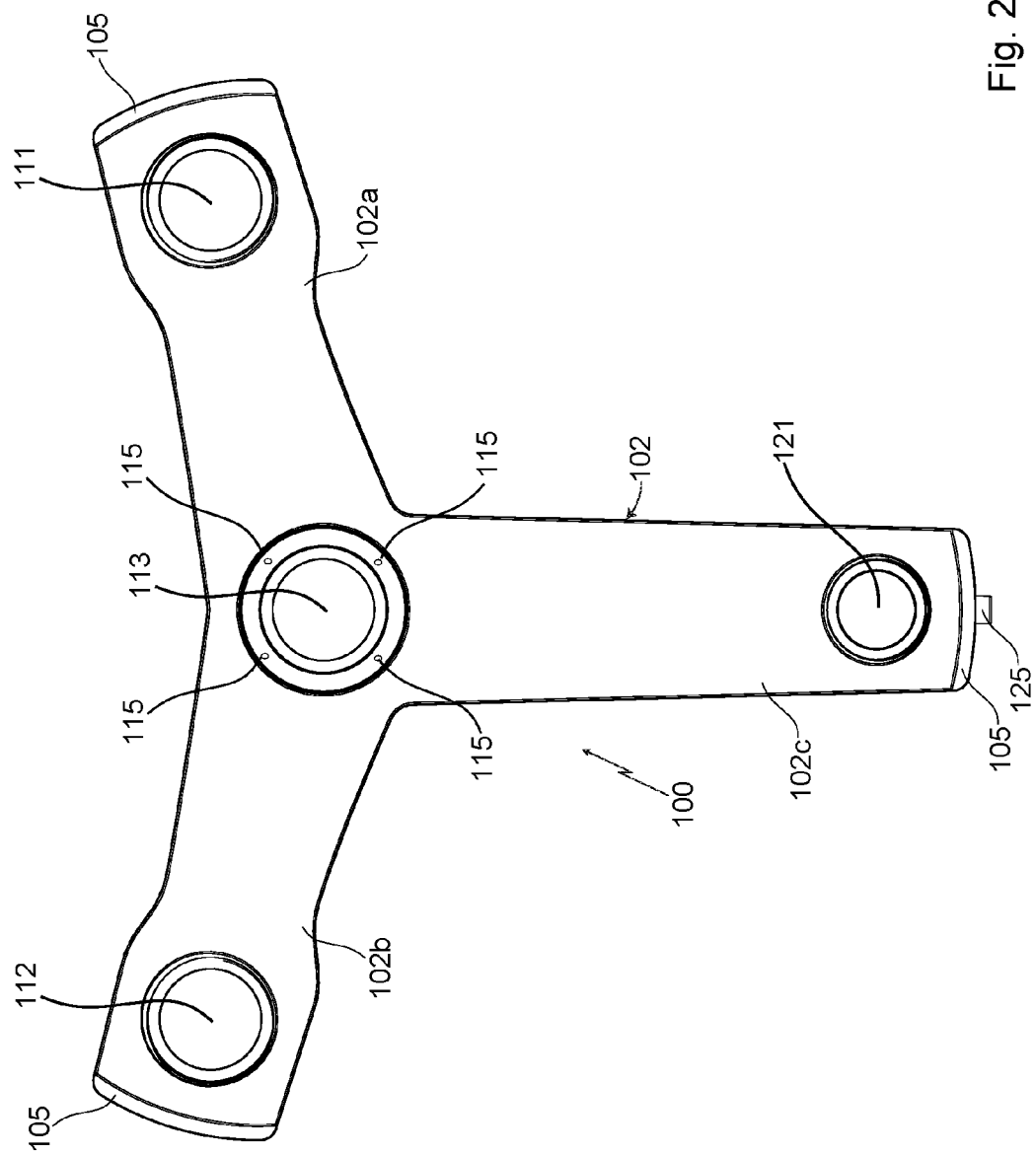
FIG. 2 shows a view of the front side of the hand-held scanner.
Figure 3:
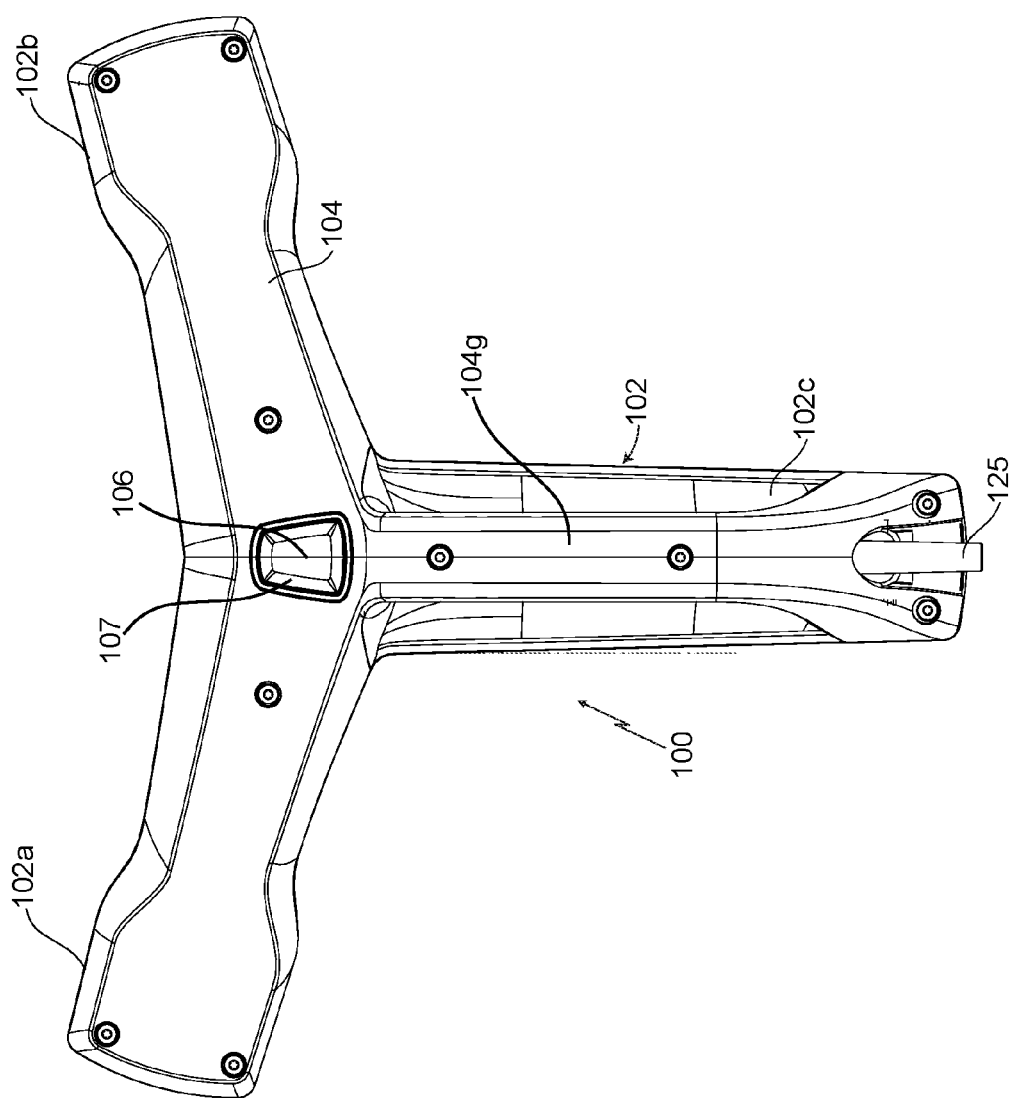
FIG. 3 shows a view of the reverse side of the hand-held scanner.
Figure 4:
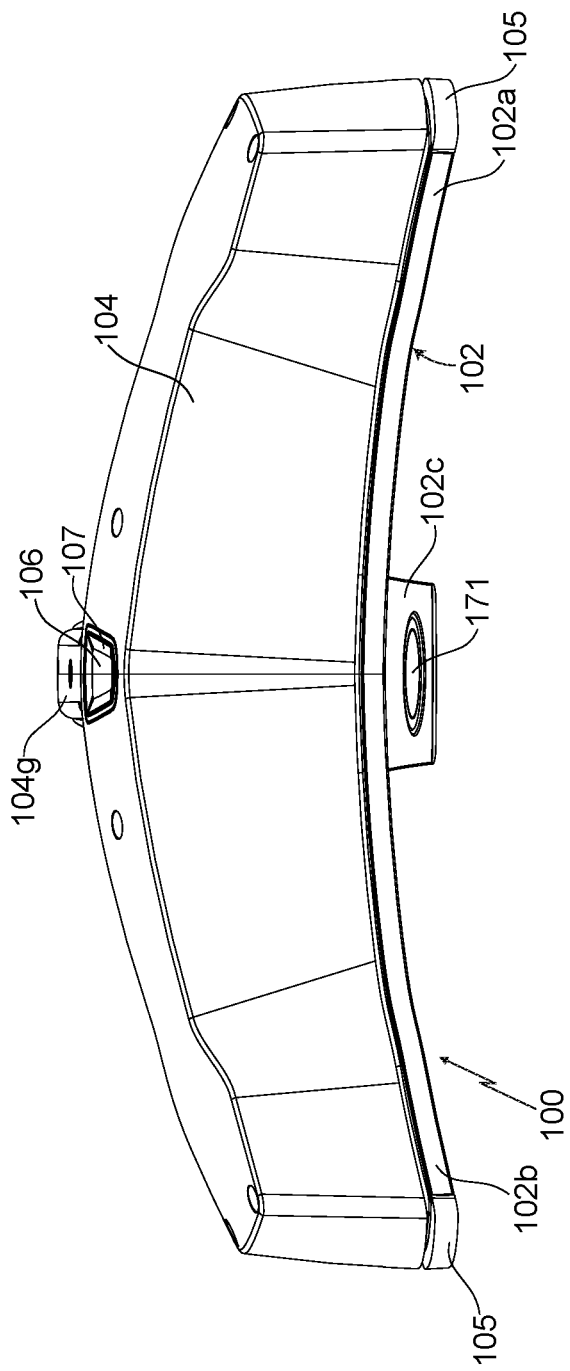
FIG. 4 shows a top view of the hand-held scanner from above.
Figure 5:
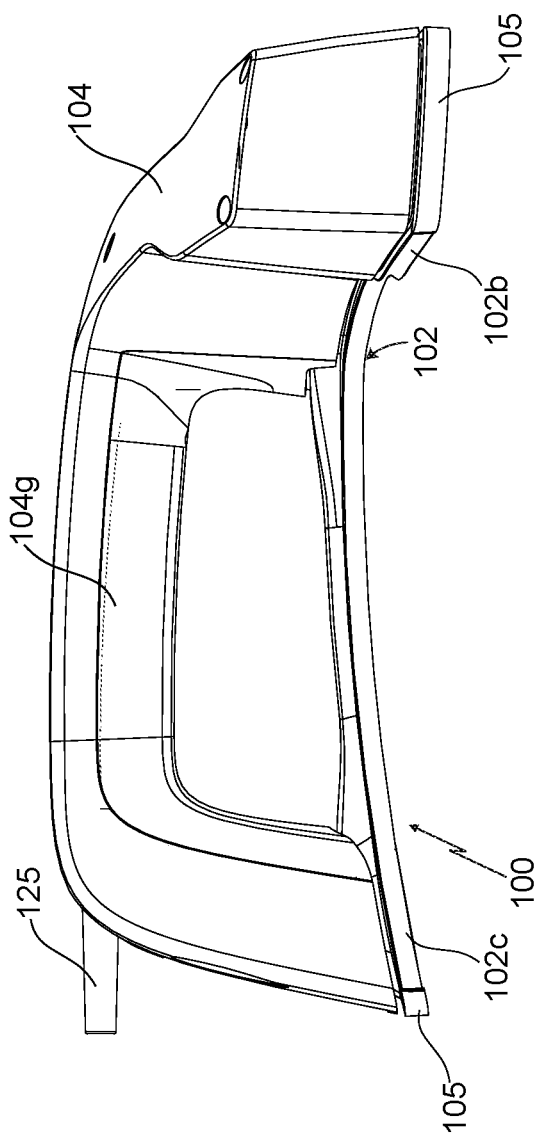
FIG. 5 shows a view of the hand-held scanner from the right side.
Figure 6:
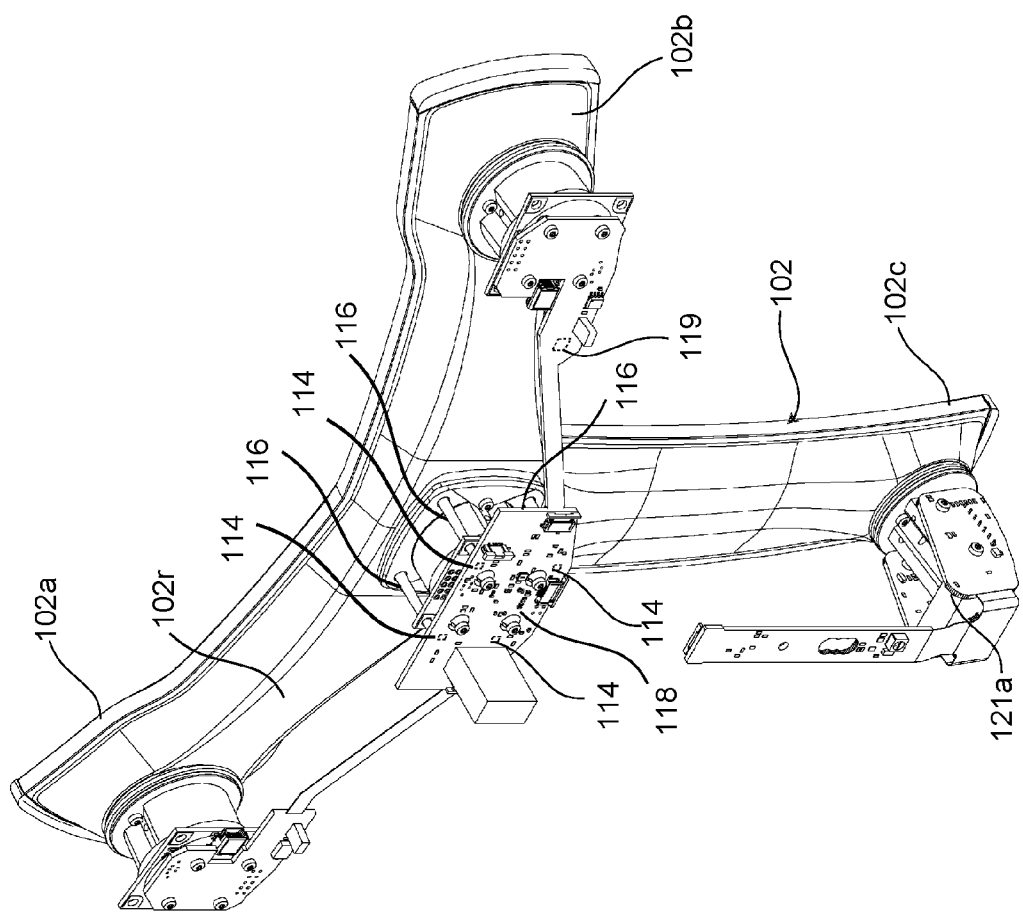
FIG. 6 shows a perspective view corresponding to FIG. 1 without housing.

The detailed description explains embodiments of the invention, together with advantages and features, by way of example with reference to the drawings.

DETAILED DESCRIPTION OF THE INVENTION

In one embodiment, the carrying structure is stable mechanically and thermally, defines the relative distances and the relative alignments of a camera and of a projector. The arrangement on a front side of the 3D measuring device that faces on the environment provides advantage in that these distances and alignments are not changed by a change of the shape of a housing.

The term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

Depending on the number of assemblies provided for distance measuring, a corresponding number of arms of the carrying structure is provided, which protrude from a common center located at the intersection of the arms. The assemblies, which may include a combination of cameras and projectors, are provided in the area of the ends of the assigned arms. The assemblies may be arranged each on the reverse side of the carrying structure. Their respective optics are directed through an assigned aperture in the carrying structure, so that the respective assemblies are operably oriented to face towards the environment from the front side. A housing covers the reverse side and forms the handle part.

In one embodiment, the carrying structure consists of a carbon-reinforced or a glass-fiber-reinforced matrix of synthetic material or ceramics (or of another material). The material provides for stability and a low weight and can, at the same time, be configured with viewing areas. A concave (spherical) curvature of the front side of the carrying structure does not only have constructive advantages, but it also protects the optical components arranged on the front side when the front surface of the 3D measuring device is placed on a work surface.

The projector produces the projected pattern, which may or may not be within the visible wavelength range. In one embodiment, the projected pattern has a wavelength in the infrared range. The two cameras are configured to acquire images from light within this wavelength range, while also filtering out scattered light and other interferences in the visible wavelength range. A color or 2D camera can be provided as third camera for additional information, such as color for example. Such camera records images of the environment and of the object being scanned. In an embodiment where the camera captures color, the point cloud generated from the scanning process (herein referred to as the "3D-scan") can have color values assigned from the color information contained in the color images.

During operation the 3D measuring device generates multiple 3D scans of the same scene, from different positions. The 3D scans are registered in a joint coordinate system. For joining two overlapping 3D scans, there are advantages in being able to recognizable structures within the 3D scans. Preferably, such recognizable structures are looked for and displayed continuously or, at least after the recording process. If, in a determined area, density is not at a desired level, further 3D scans of this area can be generated. A subdivision of the display used for representing a video image and the (thereto adjacent parts of the) three-dimensional point cloud helps to recognize, in which areas scan should still be generated.

In one embodiment, the 3D measuring device is designed as a portable scanner, i.e. it works at high speed and is of a size and weight suitable for carrying and use by a single person. It is, however, also possible to mount the 3D measuring device on a tripod (or on another stand), on a manually movable trolley (or another cart), or on an autonomously moving robot, i.e. that it is not carried by the user—optionally also by using another housing, for example without a carrying handle. It should be appreciated that while embodiments herein describe the 3D measuring device as being hand-held, this is for exemplary purposes and the claimed invention should not be so limited. In other embodiments, the 3D measuring device may also be configured as a compact unit, which are stationary or mobile and, if appropriate, built together with other devices.

Referring to FIGS. 1-6, a 3D measuring device 100 is provided as portable part of a device for optically scanning and measuring an environment of the 3D measuring device 100 with objects O. As used herein, the side of the device 100 which faces the user shall be referred to as the reverse side, and the side of the device 100 which faces the environment as the front side. This definition extends to the components of the 3D measuring device 100. The 3D measuring device 100 is provided (on its front side) visibly with a carrying structure 102 having three arms 102a, 102b, 102c. These arms give the carrying structure 102 a T-shape or a Y-shape, i.e. a triangular arrangement. The area in which the three arms 102a, 102b, 102c intersect and are connected with each other, and from which the three arms 102a, 102b, 102c protrude, defines the center of the 3D measuring device 100. From the user's view, the carrying structure 102 is provided with a left arm 102a, a right arm 102b and a lower arm 102c. In one embodiment, the angle between the left arm 102a and the right arm 102b is, for example, approximately 150°+20°, between the left arm 102a and the lower arm 102c approximately 105°+10°. The lower arm 102c is, in some embodiments, somewhat longer than the two other arms 102a, 102b.

The carrying structure 102 preferably is configured from fiber-reinforced synthetic material, such as a carbon-fiber-reinforced synthetic material (CFC). In another embodiment, the carrying structure 102 is made from carbon-fiber-reinforced ceramics or from glass-fiber-reinforced synthetic material. The material renders the carrying structure 102 mechanically and thermally stable and provides at the same time for a low weight. The thickness of the carrying structure 102 is considerably smaller (for example 5 to 15 mm) than the length of the arms 102a, 102b, 102c (for example 15 to 25 cm). The carrying structure 102 hence has a flat basic shape. In some embodiments, the arms 102a, 102b, 102c, may include a reinforced back near the center of the arm. It is, however, preferably not configured to be plane, but to be curved. Such curvature of the carrying structure 102 is adapted to the curvature of a sphere having a radius of approximately 1 to 3 m. The front side (facing the object O) of the carrying structure 102 is thereby configured to be concave, the reverse side to be convex. The curved shape of the carrying structure 102 is advantageous for providing stability. The front side of the carrying structure 102 (and in one embodiment the visible areas of the reverse side) is configured to be a viewing area, i.e. it is not provided with hiders, covers, cladding or other kinds of packaging. The preferred configuration from fiber-reinforced synthetic materials or ceramics is particularly suitable for this purpose.

On the reverse side of the carrying structure 102, a housing 104 is arranged, which is connected with the carrying structure 102 within the area of the ends of the three arms 102a, 102b, 102c in a floating way, by means of appropriate connecting means, for example by means of rubber rings and screws with a bit of clearance. As used herein, a floating connection is one that reduces or eliminates the transmission of vibration from the housing 104 to the carrying structure 102. In one embodiment, the floating connection is formed by a rubber isolation mount disposed between the housing 104 and the carrying structure. In one embodiment, an elastomeric seal, such as rubber, is disposed between the outer perimeter of the carrying structure 102 and the housing 104. The carrying structure 102 and the housing 104 are then clamped together using elastomeric bushings. The seal and bushings cooperate to form the floating connection between the carrying structure 102 and the housing 104. Within the area of the left arm 102a and of the right arm 102b, the edge of the housing 104 extends into the immediate vicinity of the carrying structure 102, while the housing 104 extends from the center of the 3D measuring device 100 within the area of the lower arm 102c, at a distance to the carrying structure 102, forming a handle part 104g, bends off at the end of the handle part 104g and approaches the end of the lower arm 102c, where it is connected with it in a floating manner. The edge of the handle 104g extends into the immediate vicinity of the carrying structure 102. In some embodiments, sections of the carrying structure 102 may include a reinforced back 102r. The back 102r protrudes into the interior of the housing 104. The housing 104 acts as a hood to cover the reverse side of the carrying structure 102 and define an interior space.

The protective elements 105 may be attached to the housing 104 or to the carrying structure 102. In one embodiment, the protective elements 105 are arranged at the ends of and extend outward from the arms 102a, 102b, 102c to protect the 3D measuring device from impacts and from damage resulting thereof. When not in use, the 3D measuring device 100 can be put down with its front side to the bottom. Due to the concave curvature of the front side, on the 3D measuring device will only contact the surface at the ends of the arms 102a, 102b, 102c. In embodiments where the protective elements 105 are positioned at the ends of the arms 102a, 102b, 102c advantages are gained since the protective elements 105 will provide additional clearance with the surface. Furthermore, when the protective elements 105 are made from a soft material for example from rubber, this provides a desirable tactile feel for the user's hand. This soft material can optionally be attached to the housing 104, particularly to the handle part 104g.

On the reverse side of the 3D measuring device 100, an control actuator or control knob 106 is arranged on the housing 104, by means of which at least optical scanning and measuring, i.e. the scanning process, can be started and stopped. The control knob 106 is arranged in the center of the housing 104 adjacent one end of the handle. The control knob 106 may be multi-functional and provide different functions based on a sequence of actions by the user. These actions may time based (e.g. multiple button pushed within a predetermined time), or space based (e.g. the button moved in a predetermined set of directions), or a combination of both. In one embodiment, the control knob 106 may be tilted in several directions in (e.g. left, right, up, down). In one embodiment, around the control knob 106 there are at least one status lamp 107. In one embodiment, there may be a plurality of status lamps 107. These status lamps 107 may be used to show the actual status of the 3D measuring device 100 and thus facilitate the operation thereof. The status lamps 107 can preferably show different colors (for example green or red) in order to distinguish several status'. The status lamps 107 may be light emitting diodes (LEDs).

On the carrying structure 102, spaced apart from each other at a defined distance, a first camera 111 is arranged on the left arm 102a (in the area of its end), and a second camera 112 is arranged on the right arm 102b (in the area of its end). The two cameras 111 and 112 are arranged on the reverse side of the carrying structure 102 and fixed thereto, wherein the carrying structure 102 is provided with apertures through which the respective camera 111, 112 can acquire images through the front side of the carrying structure 102. The two cameras 111, 112 are preferably surrounded by the connecting means for the floating connection of the housing 104 with the carrying structure 102.

Each of the cameras 111, 112 have a field of view associated therewith. The alignments of the first camera 111 and of the second camera 112 to each other are adjusted or adjustable in such a way that the fields of view overlap to allow stereoscopic images of the objects O. If the alignments are fixed, there is a desired predetermined overlapping range, depending on the application in which the 3D measuring device 100 is used. Depending on environment situations, also a range of several decimeters or meters may be desired. In another embodiment, the alignments of the cameras 111, 112 can be adjusted by the user, for example by pivoting the cameras 111, 112 in opposite directions. In one embodiment, the alignment of the cameras 111, 112 is tracked and therefore known to the 3D measuring device 100. In another embodiment, the alignment is initially at random (and unknown), and is then determined, such as be measuring the positions of the camera's for example, and thus known to the 3D measuring device 100. In still another embodiment, the alignment is set and fixed during manufacturing or calibration of the 3D measurement device 100. In embodiments where the first and second cameras 111, 112 are adjusted, a calibration may be performed in the field to determine the angles and positions of the cameras in the 3D measuring device 100. The types of calibrations that may be used are discussed further herein.

The first camera 111 and the second camera 112 are preferably monochrome, i.e. sensitive to a narrow wavelength range, for example by being provided with corresponding filters, which then filter out other wavelength ranges, including scattered light. This narrow wavelength range may also be within the infrared range. In order to obtain color information on the objects O, the 3D measuring device 100 preferably includes a 2D camera, such as color camera 113 which is preferably aligned symmetrically to the first camera 111 and to the second camera 112, and arranged in the center of the 3D measuring device 100, between the cameras 111, 112. The 2D camera 113 may include an image sensor that is sensitive to light in the visible wavelength range. The 2D camera 113 captures 2D images of the scene, i.e. the environment of the 3D measuring device 100, including the objects O therein included.

In order to illuminate the scene for the 2D camera, in the event of unfavorable lighting conditions, at least one, in the illustrated embodiment a light source, such as four (powerful) light-emitting diodes (LED) 114 are provided. One radiating element 115 is associated with each of the LEDs 114. The light emitted from the light-emitting diode 114 is deflected in correspondence with the alignment of the 3D measuring device 100, from the corresponding LED 114. Such a radiating element 115 can, for example, be a lens or an appropriately configured end of a light guide. The (in the illustrated embodiment four) radiating elements 115 are arranged equally around the color camera 113. Each LED 114 is connected with the assigned radiating element 115 by means of one light guide each. The LED 114 therefore can be structurally arranged at a control unit 118 of the 3D measuring device 100, such as by being fixed on a board thereof.

In order to later have a reference for the images recorded by the cameras 111, 112, 113, a sensor such as an inclinometer 119 is provided. In one embodiment, the inclinometer 119 is an acceleration sensor (with one or several sensitive axes), which is manufactured in a manner known per se, as MEMS (micro-electro-mechanical system). As inclinometer 119, also other embodiments and combinations are possible. The data of the 3D measuring device 100 each have (as one component) a gravitation direction provided by the inclinometer 119.

During operation images are recorded by the first camera 111 and by the second camera 112. From these images three-dimensional data can be determined, i.e. 3D-scans of the objects O can be produced, for example by means of photogrammetry. The objects O, however, may have few structures or features and many smooth surfaces. As a result, the generation of 3D-scans from the scattered light of the objects O is difficult.

To resolve this difficulty, a projector 121 may be used, which is arranged at the lower arm 102c (in the area of its end). The projector 121 is arranged within the interior space on the reverse side of the carrying structure 102 and fixed thereto. The carrying structure 102 is provided with an aperture through which the projector 121 can project a pattern of light through the front side of the carrying structure 102. In one embodiment, the projector 121 is surrounded by the connecting means to provide a floating connection between the housing 104 with the carrying structure 102. The projector 121, the first camera 111, and the second camera 112 are arranged in a triangular arrangement with respect to each other and aligned to the environment of the 3D measuring device 100. The projector 121 is aligned in correspondence with the two cameras 111, 112. The relative alignment between the cameras 111, 112 and the projector 121 is preset or can be set by the user.

In one embodiment, the cameras 111, 112 and the projector 121 form an equilateral triangle and have a common tilt angle. When arranged in this manner, and if the field of view of the cameras 111, 112 and the projector 121 are similar, the centers of the field of view will intersect at a common point at a particular distance from the scanner 100. This arrangement allows for a maximum amount of overlap to be obtained. In embodiments where the tilt or angle of the cameras 111, 112 and projector 121 may be adjusted, the distance or range to the intersection of the fields of view may be changed.

If the user places 3D measuring device 100 on a surface on its front side, i.e. with the front side to the surface, the concave curvature of the front side creates a gap between the cameras 111, 112, 113 and the projector 121 from the surface, so that the respective lenses are protected from damage.

The cameras 111, 112, 113, the projector 121, the control knob 106, the status lamps 107, the light-emitting diodes 114 and the inclinometer 119 are connected with the common control unit 118, which is arranged inside the housing 104. This control unit 118 can be part of a control and evaluation device which is integrated in the housing. In an embodiment, the control unit 118 is connected with a standardized communication interface at the housing 104, the interface being configured for a wireless connection (for example Bluetooth, WLAN, DECT) as an emitting and receiving unit, or for a cable connection (for example USB, LAN), if appropriate also as a defined interface, such as that described in DE 10 2009 010 465 B3, the contents of which are incorporated by reference herein. The communication interface is connected with an external control and evaluation device 122 (as a further component of the device for optically scanning and measuring an environment of the 3D measuring device 100), by means of said wireless connection or connection by cable. In the present case, the communication interface is configured for a connection by cable, wherein a cable 125 is plugged into the housing 104, for example at the lower end of the handle part 104g, so that the cable 125 extends in prolongation of the handle part 104g.

The control and evaluation device 122 may include one or more processors 122a having memory. The processor 122a being configured to carry out the methods for operating and controlling the 3D measuring device 100 and evaluating and storing the measured data. The control and evaluation device 122 may be a portable computer (notebook) or a tablet (or smartphone) such as that shown in FIGS. 7 and 8, or any external or distal computer (e.g. in the web). The control and evaluation device 122 may also be configured in software for controlling the 3D measuring device 100 and for evaluating the measured data. However, the control and evaluation device 122 may be embodied in separate hardware, or it can be integrated into the 3D measuring device 100. The control and evaluation device 122 may also be a system of distributed components, at least one component integrated into the 3D measuring device 100 and one component externally. Accordingly, the processor(s) 122a for performing said methods may be embedded in the 3D measuring device 100 and/or in an external computer.

The projector 121 projects a pattern X, which it produces, for example by means of a diffractive optical element, on the objects O to be scanned. The pattern X does not need to be encoded (that is to say single-valued), but may be uncoded, for example periodically (i.e. multivalued). The multi-valuedness is resolved by the use of the two cameras 111, 112, combined with the available, exact knowledge of the shape and direction of the pattern. The uncoded pattern may, for example, be a projection of identical periodically spaced pattern elements (e.g. spots or lines of light). The correspondence between the projected pattern elements from the projector 121 and the pattern elements in the images on the photosensitive arrays of the cameras 111, 112 is determined through simultaneous epipolar constraints and using calibration parameters, as discussed further herein. The uniqueness in the correspondence of the points is achieved by the use of the two cameras 111 and 112, combined with the knowledge of the shape and direction of the pattern, the combined knowledge being obtained from a calibration of the 3D measuring device 100.

As used herein, the term "pattern element" should means the shape of an element of the pattern X, while the term "point" should indicate the position (of a pattern element or of something else) in 3D coordinates.

Figure 9:
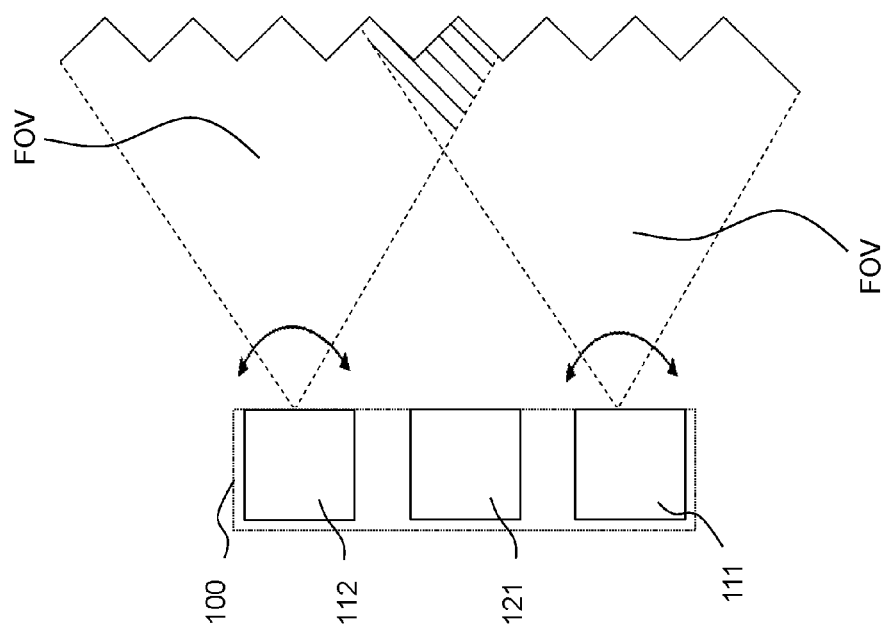
FIG. 9 shows the fields of view of the cameras with shaded overlap.

The uncoded pattern X (FIG. 1) is preferably a point pattern, comprising a regular arrangement of points in a grid. In the present invention, for example, approximately one hundred times one hundred points (10,000 points total) are projected over a field of view FOV (FIG. 9) at an angle of approximately 50° to a distance of approx. 0.5 m to 5 m. The pattern X can also be a line pattern or a combined pattern of points and lines, each of which is formed by tightly arranged light points. The first camera 111 comprises a first image plane B111, and the second camera 112 comprises a second image plane B112. The two cameras 111 and 112 receive at least a portion of the pattern X in their respective image planes B111 and B112, in which the photosensitive arrays (for example CMOS or CCD arrays) are arranged to capture a portion of the pattern X reflected from the object O.

There is a relationship between the point density, the distance between the projector 121 and the object O and the resolution that can be obtained with the produced pattern X. With diffractive pattern generation, the light of one source is distributed over the pattern. In that case the brightness of the pattern elements depends on the number of elements in the pattern when the total power of the light source is limited. Depending on the intensity of the light scattered from the objects and the intensity of background light it may be determined whether it is desirable to have fewer but brighter pattern elements. Fewer pattern elements means the acquired point density decreases. It therefore seems helpful to be able to generate, in addition to pattern X, at least one other pattern. Depending on the generation of the patterns, a dynamic transition between the patterns and/or a spatial intermingling is possible, in order to use the desired pattern for the current situation. In an embodiment, the projector 121 may produce the two patterns offset to each other with respect to time or in another wavelength range or with different optical intensity. The other pattern may be a pattern which deviates from pattern X, such as an uncoded pattern. In the illustrated embodiment the pattern is a point pattern with a regular arrangement of points having another distance (grid length) to each other.

In one embodiment, the pattern X is a monochromatic pattern. The pattern X may be produced by means of a diffractive optical element 124 in the projector 121. The diffractive optical element 124 converts a single beam of light from a light source 121a in FIG. 20 to a collection of collection of beams, each having lower optical power than the single beam. Each of the collection of beams traveling in a different direction to produce a spot when striking the object O. The light source 121a may be a laser, a superluminescent diode, or an LED, for example. In an embodiment, the wavelength of the light source 121a is in the infrared range. The lateral resolution is then limited only by the diameter and spacing of the spots of light in the projected pattern X. If the pattern X is in the infrared range, it is possible to capture the images of the object O and surrounding environment with the 2D camera 113 without interference from the pattern X. Similarly, if the pattern X is produced in the ultraviolet light wavelength range, the images acquired by the 2D camera 113 would not have interference from the pattern X.

In one embodiment, the projector 121 produces the pattern X on the objects O only during the time periods when the cameras 111, 112 (and if available 113) are recording images of the objects O. This provides advantages in energy efficiency and eye protection. The two cameras 111, 112 and the projector 121 are synchronized or coordinated with each other, with regard to both, time and the pattern X used. Each recording process starts by the projector 121 producing the pattern X, similar to a flash in photography, followed by the cameras 111, 112 (and, if available 113) acquiring pairs of images, in other words one image each from each of the two cameras 111, 112. As used herein, these pairs of images that are acquired at substantially the same time are referred to as "frames." The recording process can comprise one single frame (shot), or a sequence of a plurality of frames (video). Such a shot or such a video is triggered by means of the control knob 106. After processing of the data, each frame then constitutes a 3D-scan consisting of a point cloud in the three-dimensional space. This point cloud is defined in the relative local coordinate system of the 3D measuring device 100.

The data furnished by the 3D measuring device 100 are processed in the control and evaluation device 122 to generate the 3D scans from the frames. The 3D scans in turn are joined or registered in a joint coordinate system. For registering, the known methods can be used, such as by identifying natural or artificial targets (i.e. recognizable structures) in overlapping areas of two 3D scans. Through identification of these targets, the assignment of the two 3D scans may be determined by means of corresponding pairs. A whole scene (a plurality of 3D scans) is thus gradually registered by the 3D measuring device 100. The control and evaluation device 122 is provided with a display 130 (display device), which is integrated or connected externally.

Figure 10:
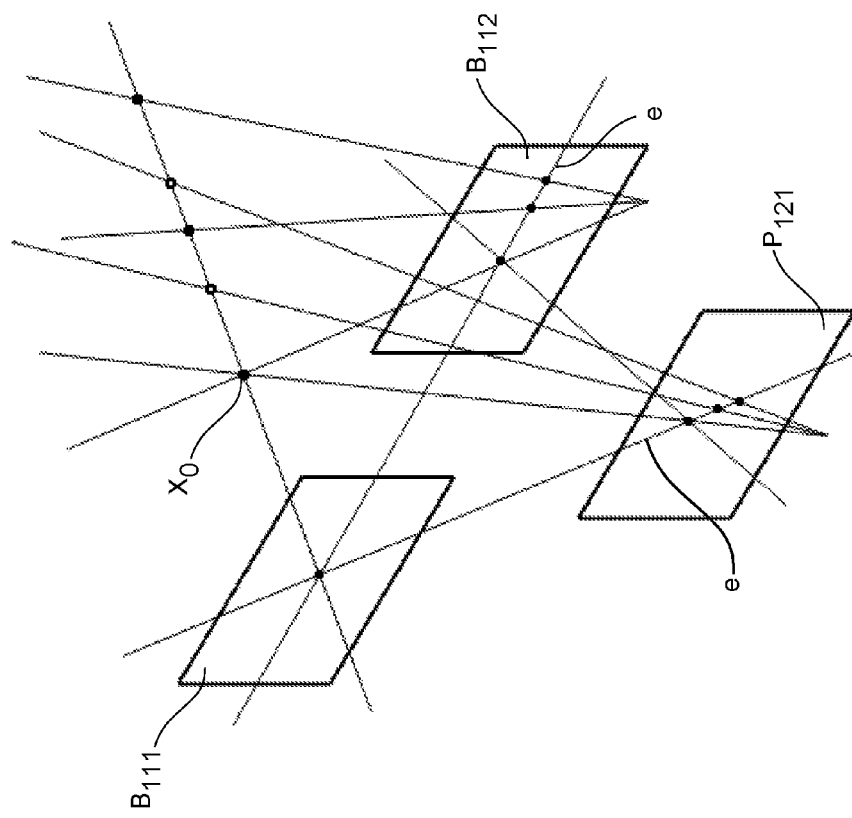
FIG. 10 shows the geometrical relationship of the image planes, projector plane, and epipolar lines.

In the exemplary embodiment, the projector 121 is not collinear with the two cameras 111 and 112, but rather the camera's 111, 112 and projector 121 are arranged to form a triangle. As shown in FIG. 10, this triangular configuration enables the use of epipolar geometry based on mathematic methods of optics. The constraints of epipolar geometry provide that a point on the projector plane $P_{121}$ of the projector 121 falls on a first epipolar line on the first image plane $B_{111}$ and on a second epipolar line of the second image plane $B_{112}$, the epipolar lines for each of the image planes $B_{111}$ and $B_{112}$ being determined by the relative geometry of the projector 121 and the two cameras 111 and 112. Further, a point on the first image plane $B_{111}$ falls on an epipolar line of the projector plane $P_{121}$ and on an epipolar line of the second image plane $B_{112}$, the epipolar lines in the projector plane and second image plane being determined by the relative geometry of the projector 121 and cameras 111, 112. Further still, a point on the second image plane $B_{112}$ falls on an epipolar line of the projector plane $P_{121}$ and on an epipolar line of the first image plane $B_{111}$, the epipolar lines in the projector plane and the first image plane being determined by the relative geometry of the projector 121 and cameras 111, 112. It can be seen that the use of at least two cameras and one projector provides sufficient epipolar constraints to enable a correspondence among points in the pattern X to be determined for the points on the image planes $B_{111}$ and $B_{112}$ and the projector plane $P_{121}$, even though the projected pattern elements have no distinguishing characteristics, such as having an identical shape for example (an uncoded pattern).

In one embodiment, at least three units (e.g. projector 121 and the two cameras 111, 112) are used to generate the 3D scenes. This allows for unambiguous triangular relations of points and epipolar lines from which the correspondence of projections of the pattern (X) in the two image planes $B_{111}$, $B_{112}$ can be determined. Due to the additional stereo geometry relative to a pair of cameras, considerably more of the points of the pattern, which otherwise cannot be distinguished, can be identified on an epipolar line "e." The density of features on the object O can thus simultaneously be high, and the size of the pattern X feature (e.g. the spot) can be kept very low. This contrasts with other methods that utilize encoded patterns where the size of the feature in the pattern has a lower limit based on the resolution of the projector, this size limitation in coded patterns limits the lateral resolution of the 3D scan. Once the correspondence among the points X on the projector 121 and cameras 111, 112 has been determined, the three-dimensional coordinates of the points on the surface of the object O may be determined for the 3D-scan data by means of triangulation.

Triangulation calculations may be performed between the two cameras 111, 112 based on the baseline distance between the two cameras 111, 112 and the relative angles of tilt of the two cameras 111, 112. Triangulation calculations may also be performed between the projector 121 and first camera 111 and between the projector 121 and the second camera 112. To perform these triangulation calculations, a baseline distance is needs to be determined between the projector 121 and the first camera 111 and another baseline distance is needs to be determined between the projector 121 and the second camera 112. In addition, the relative angles of tilt between the projector/first camera and projector/second camera is used.

In principle, any one of the three triangulation calculations is sufficient to determine 3D coordinates of the points X on the object O, and so the extra two triangulation relations provides redundant information (redundancies) that may be usefully employed to provide self-checking of measurement results and to provide self-calibration functionality as described further herein below. As used herein, the term "redundancy" refers to multiple determinations of 3D coordinates for a particular point or set of points on the object.

Additional three-dimensional data can be gained by means of photogrammetry methods by using several frames with different camera positions, for example from the 2D camera 113 or from a part of an image acquired by the cameras 111, 112. To perform photogrammetry calculations the objects viewed by the cameras 111, 112, 113 should be illuminated. Such illumination may be background illumination, such as from the sun or artificial lights for example. The background illumination may be provided by the 3D measuring device 100 or by another external light source. In an embodiment, the object is illuminated with light from LEDs 114. Illumination enables the two-dimensional cameras 111, 112, 113 to discern properties of the object such as color, contrast, and shadow, which facilitate identification of object features.

The measuring process may also have a temporal aspect. Typically, uncoded patterns were used with stationary devices to allow an entire sequence of patterns to be projected and images be captured in order to determine a single 3D-scan. In order for this 3D scan to be determined, both the scanner and the object needed to remain stationary relative to each other. In contrast, embodiments of the present invention generate one 3D-scan for each set of images acquired by the cameras 111, 112. In another embodiment (not shown), a second projector is arranged adjacent to the present projector 121 or a further diffractive optical element is provided. This second projector emits at least one second pattern on to the object O in addition to pattern X. In an embodiment having two projectors, it is possible to switch between the pattern X and the second pattern to capture with one set of images with the different patterns consecutively. Thus, the 3D-scan has a higher resolution by combining the evaluation results obtained from the different patterns.

In order to determine the coordinates of the entire object, the 3D-scans which are produced from the images acquired by the cameras 111, 112 need to be registered. In other words, the three-dimensional point clouds of each frame must be inserted into a common coordinate system. Registration is possible, for example, by videogrammetry, such as "structure from motion" (SFM) or "simultaneous localization and mapping" (SLAM) methods for example. The natural texture of the objects O may also be used for common points of reference. In one embodiment, a stationary pattern is projected and used for registration.

The data furnished by the 3D measuring device 100 is processed in the control and evaluation device 122 by generating 3D scans from the image frames. The 3D scans in turn are then joined or registered in a common coordinate system. As discussed above, registration methods know in the art may be used, such as by using natural or artificial targets (i.e. recognizable structures) for example. These targets can be localized and identified in order to determine the assignment or alignment of two different 3D scans relative to each other by means of corresponding pairs. The 3D scans (sometimes colloquially referred to as a "scene") may then be gradually registered by the 3D measuring device 100. In the exemplary embodiment, the control and evaluation device 122 is provided with a display 130 (display device) to allow the user to review the 3D scans.

Figure 11:
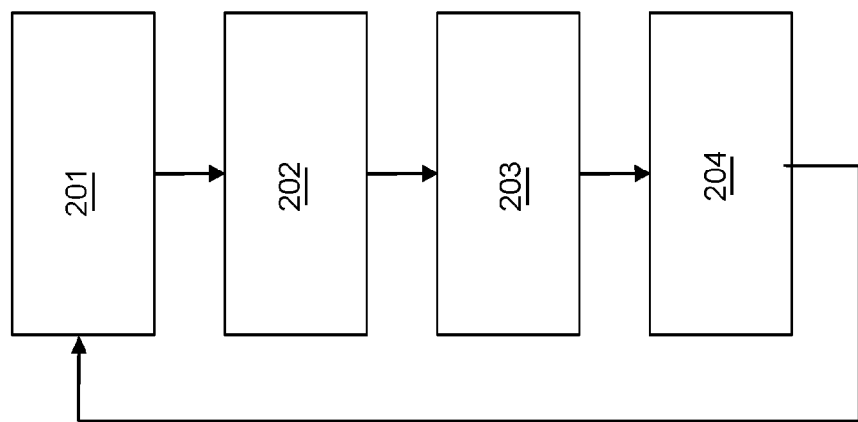
FIG. 11 shows an exemplary method for optically scanning and measuring an environment.

An embodiment is shown in FIG. 11 for the process of the optically scanning and measuring the environment of the 3D measuring device 100. In a first process block 201, the capturing of a pair of images for one frame is performed and the measured values are determined and recorded. In the exemplary embodiment, each image is a 2D array of values representing the voltages corresponding to the number of electrons in each pixel well.

The process then proceeds to a second process block 202, where the measured values are evaluated and the 3D-scan data are generated from the frame. In the second process block, the numbers are evaluated in combination with the known positions of the projected spots from the projector to determine the 3D coordinates of points on the object O. The distances for each of the pixels are obtained using the triangulation calculation (including the epipolar geometry calculation) and the two angles for each pixel are determined based on the location of the pixel and the camera geometry (lens focal length, pixel size, etc.).

The process then proceeds to a third process block 203 where multiple frames of 3D-scan data are registered in a common coordinate system. In one embodiment, videogrammetry information is obtained with the center color camera 113 to assist in the registration. In one embodiment, a representation of the 3D scan data is displayed and stored. Finally, the process proceeds to a fourth process block 204 where an auto-calibration is performed. In one embodiment, the auto-calibration performed in fourth process block 204 may occur simultaneously with the second process block 202 or may be performed sequentially therewith. As long as the operator continues operation to additional frames are acquired, such as by continuously pressing the control knob 106 for example, the process returns to the first process block 201.

In the second process block 202, images of particular points are selected in a frame for automatically determining correspondence. These selected points correspond to points on the object O, in particular to pattern elements (e.g. spots) of the pattern X. For each image of a selected point in the first image plane $B_{111}$, the epipolar lines "e" are consecutively located in the second image plane $B_{112}$ and in the projector plane $P_{121}$. This procedure for locating the epipolar lines "e" is repeated for images of points in the second image plane $B_{112}$ and for images of points in the projector plane $P_{121}$. These multiple epipolar constraints enable the determination of one-to-one correspondence in each of the three planes between the projected and received pattern elements (e.g., identical spots). As shown in FIG. 10, the point $X_0$ (of the pattern X on the object O) is visible on all three planes $B_{111}$, $B_{112}$, $P_{121}$, and its image is on two epipolar lines "e" on each plane. The point $X_0$ is the intersection point of three straight lines, a light beam of the projector 121, and each one light beam of the two cameras 111, 112. The point $X_0$ can thus be identified unambiguously, if the density of the points of the pattern X is sufficiently low.

Auto-calibration performed in block 204 takes place automatically and does not require the use of external calibration objects. Starting with the initial calibration and later with the currently used calibration, the frames are examined for inconsistencies in terms of space (inconsistencies of geometry) and time (parameters change over time), in order to correct calibration, if appropriate. The inconsistencies can have thermal causes, such as due to an increase of operating temperature for example. The inconsistencies may also have mechanical causes, such as a mechanical shock caused by the 3D measuring device 100 striking a surface or the floor for example. These inconsistencies may manifest through deviations in measured positions, angles and other geometrical features of e.g. points on the objects or in the planes $B_{111}$, $B_{112}$, $P_{121}$.

The calibration parameters which may be corrected may be extrinsic parameters, intrinsic parameters, and operating parameters. Extrinsic parameters for each unit (cameras 111, 112, 113 and projector 121) include the six degrees of freedom of rigid bodies, i.e. three positions and three angles. Particularly relevant is the relative geometry between the cameras 111, 112, 113 and the projector 131, such as the relative distances and relative angles of their alignments for example. Intrinsic parameters may be related to camera or projector device features such as but not limited to the focal length, position of principal point, distortion parameters, centering of the photosensitive array or MEMS projector array, scale of the array in each direction, rotation of the array relative to the local coordinate system of the 3D measuring device 100, and aberration correction coefficients for the camera or projector lens system. Operating parameters may be the wavelength of the light source 121a, the temperature and the humidity of the air.

With respect to FIG. 10, an inconsistency may be a deviation $\Delta$ of the actual position of the point $X_0$ with respect to its expected theoretical position in one of the three planes.

As explained herein above, epipolar constraints are solved simultaneously to determine the correspondence of projected and imaged pattern elements (i.e. their images) on the two cameras 111, 112 and one projector 121. Some redundant information (redundancies) from these simultaneous equations is available to reveal inconsistencies in the correspondences.

In addition, as explained herein above, three separate triangulation calculations may be performed to obtain three sets of 3D coordinates. These three triangulation calculations are: 1) between the first and second cameras 111, 112 (stereo cameras); 2) between the projector 121 and first camera 111; and 3) between the projector 121 and second camera 112. The 3D coordinates obtained from the three different triangulation calculations may be compared and, if inconsistencies are seen, changes may be made to the calibration parameters.

Figure 12:
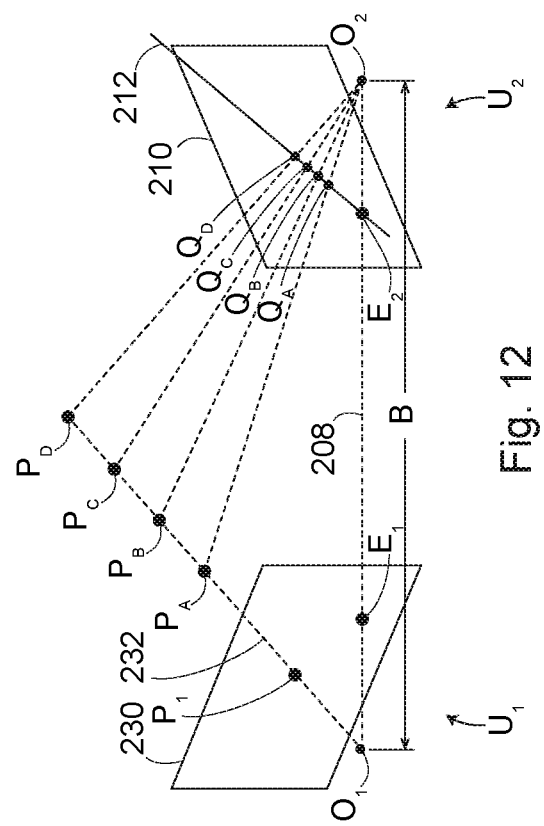
FIG. 12 shows an example with one epipolar line.

FIG. 12 shows a simplified situation of the inconsistency with two units $U_1$, $U_2$. The units $U_1$, $U_2$ may be either between the two cameras 111, 112 or between the projector 121 and one of the cameras 111, 112 for example. Each unit $U_1$, $U_2$ comprises a plane, in which points may be selected. The two epipolar lines "e" are common for both planes. A selected point 236 in the plane of unit $U_1$ is corresponding to a point 216 in the plane of unit $U_2$. It should be appreciated that both points 216, 236 are the images of a real point on the object O. The correspondence may be detected, such as when the point 216, 236 is the image of a spot of the pattern X on the object O for example. In one embodiment, the "spot" on the object O is illuminated and adjacent area is dark or darker than the illuminated point. However, when the distance of the point 216, 236 perpendicular to the epipolar lines "e" is not the same in both planes, but a deviation $\Delta$ occurs, i.e. a deviation $\Delta$ between the position of the point 216 and an expected position 218.

Figure 13:
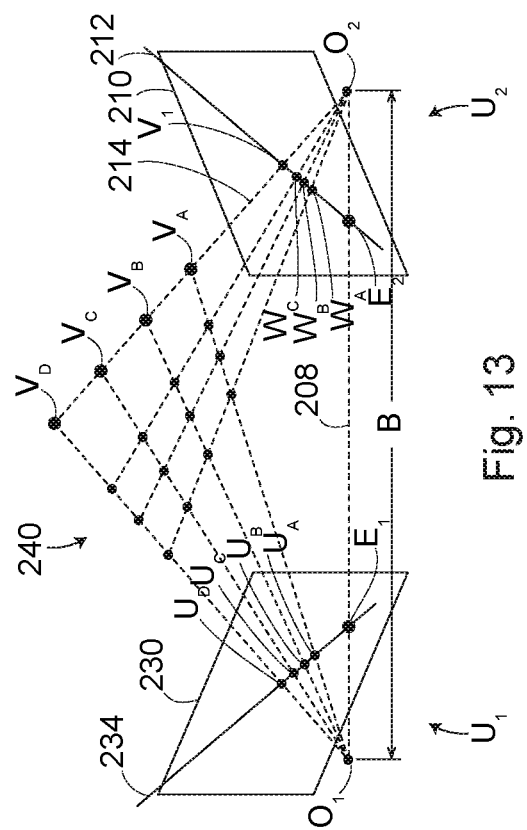
FIG. 13 shows an example with two epipolar lines.

In general, the deviation $\Delta$ is a vector. In an embodiment having two units $U_1$, U2, such as the projector 121 and camera 111 for example, only the component of the deviation $\Delta$ perpendicular to the epipolar lines "e" is known. The component parallel to the epipolar lines "e" vanishes when determining the 3D coordinates. In an embodiment having more than two units, such as the projector 121 and both cameras 111, 112 for example, the components of deviation $\Delta$ in both dimensions of the planes may be determined due to the redundant measurements (redundancies in detecting deviations and in determining 3D coordinates). Having deviations $\Delta$ for several selected points, all determined deviations $\Delta$ may be drawn into a map shown in FIG. 13, the sometimes referred to as an error field. In case of only two units, only one component of each deviation $\Delta$ can be drawn into the error field. Where an inconsistency is due to a single cause or reason, the error field is typical for a certain type of inconsistency. FIG. 13 illustrates an example of an error field that is generated by the rotation of the first camera 111 about the direction of view, such as when the calibration parameter for the roll angle of the first camera 111 is incorrect.

Figure 14:
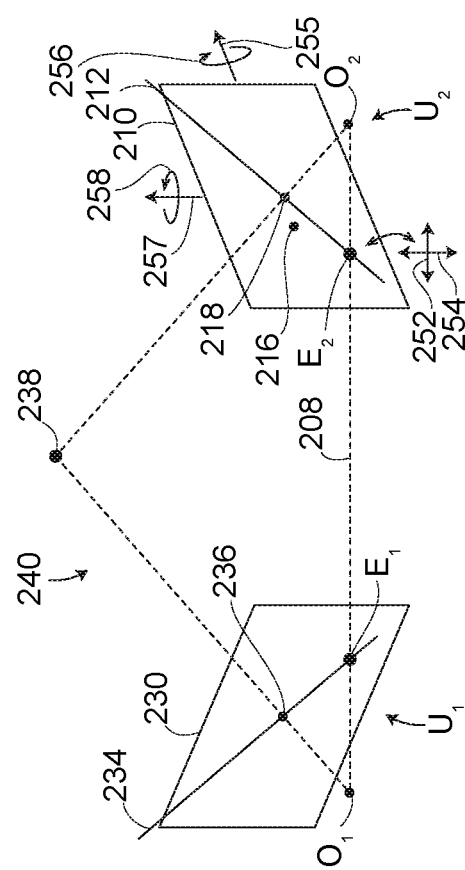
FIG. 14 shows an example with inconsistencies.
Figure 15:
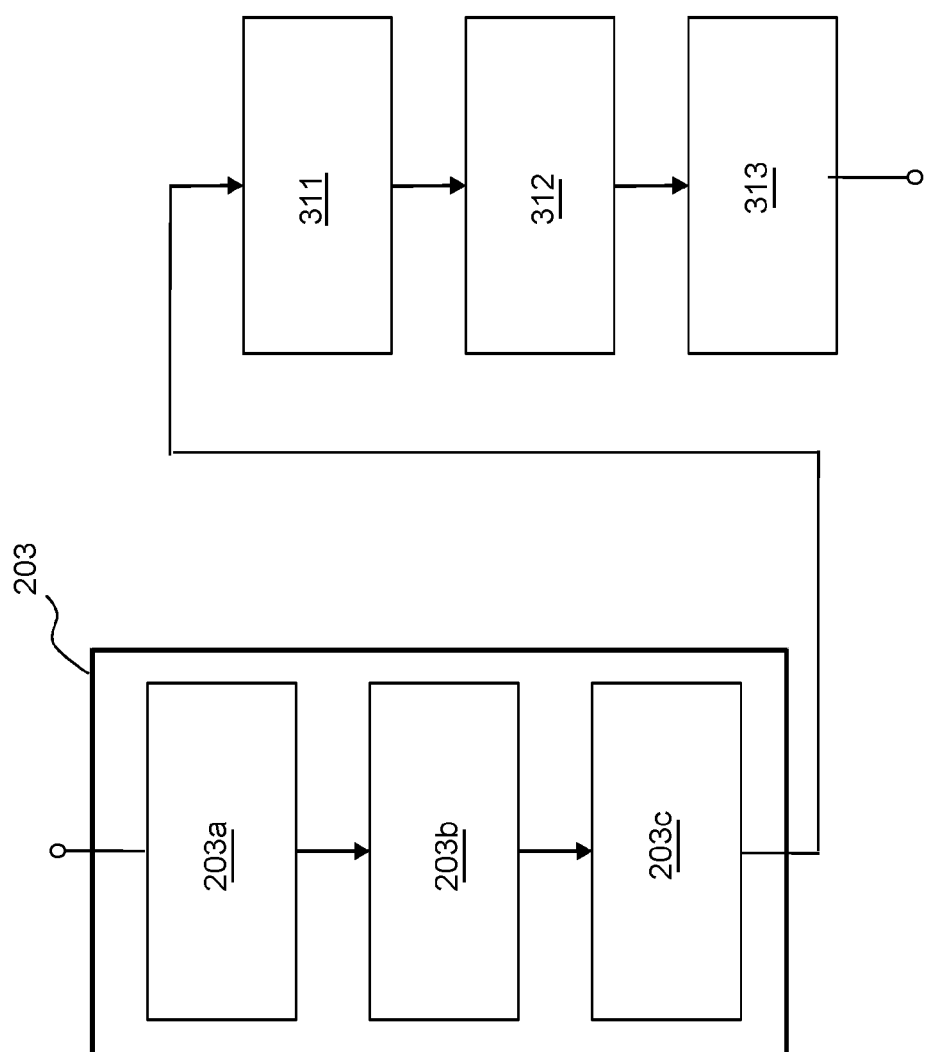
FIG. 15 shows steps of the third process block and steps of the method for controlling by means of movements.

Referring now to FIGS. 12-14, the deviations $\Delta$ are now described with respect to epipolar constraints. In general, there are two possibilities for the involved units (cameras and projectors). One possibility is that one of the units $U_1$, $U_2$ is a camera and the other is a projector. The other possibility is that both units $U_1$, $U_2$ are cameras. It should be appreciated that the use of a single projector and two cameras is for exemplary purposes and the claimed invention should not be so limited. In other embodiments additional projectors or cameras may be used. Having three of more units (for example, having two cameras and one projector) gives additional capability in automatically determining calibration parameters, as discussed in more detail herein.

Each of the units $U_1$, $U_2$ has an origin point sometimes referred to as the perspective center point $O_1$, $O_2$ or center of projection. This point represents a point through which all rays pass out of the unit (for a projector) or into the unit (for a camera). It should be appreciated that in an actual device, not all of the rays pass through the perspective center points, however corrections may be made in software to the calibration parameters of the camera system to bring the corrected rays through these points. The two perspective center points $O_1$, $O_2$ define the baseline distance 208 between the units $U_1$, $U_2$.

Each of the units $U_1$, $U_2$ also has a plane 210, 230 in which images are formed. In a projector, this plane is known as the projector plane $P_{121}$ and, in a camera, it is known as an image plane $B_{111}$, $B_{112}$. Typically, in an actual projector or camera, the projector plane $P_{121}$ or image plane $B_{111}$, $B_{112}$ is behind the perspective center $O_1$, $O_2$ rather than in front of it as illustrated in FIG. 14. In most cases, a hardware device such as a photosensitive array (in a camera) or a pattern generator (in a projector) is placed at the position of the plane behind the perspective center. However, it should be appreciated that the position of the planes in front of the perspective centers as shown in FIG. 14 is mathematically equivalent to the planes being positioned on the other side of the perspective centers.

The perspective centers $O_1$, $O_2$ are separated by a baseline distance B. The baseline 208 that connects the perspective centers $O_1$, $O_2$ intersects the planes 230, 210 in points $E_1$, $E_2$. The points of intersection are referred to as epipolar points, also known as epipoles. A line drawn through one of the epipoles on a corresponding plane is referred to as an epipolar line. For the case of the plane 210 and corresponding epipole $E_2$, the epipolar line is 212. A point $P_1$ on the plane 230 lies on the epipolar line 212.

As explained above, each ray such as ray 232 passes through a perspective center point $O_1$ to arrive at a plane such as 230 in which images are formed. If the plane 230 is a projector plane, then the point $P_1$ is projected onto an object at a point such as $P_A$, $P_B$, $P_C$ or $P_D$, depending on the distance to the object. These points $P_A$, $P_B$, $P_C$, $P_D$, which share the common ray 232, fall onto the epipolar line 212 at corresponding points $Q_A$, $Q_B$, $Q_C$, or $Q_D$ on unit $U_2$, which in this example is a camera. The ray 232 and the epipolar line 212 are both on the plane that includes the points $O_1$, $O_2$, and $P_D$. If the plane 230 is a camera plane rather than a projector plane, then the point $P_1$ received by the camera image plane may arrive from any point on the epipolar line 212, for example, from any of the points $Q_A$, $Q_B$, $Q_C$, or $Q_D$.

FIG. 13 shows an epipolar line 234 on the plane 230 of unit $U_1$ in addition to the epipolar line 212 of the plane 210 of unit $U_1$. Any point $V_1$ (and $W_A$, $W_B$, $W_C$) on the epipolar line 212 must have a corresponding point (image or projection point) $U_A$, $U_B$, $U_C$, $U_D$ on the epipolar line 234. Similarly, any point $U_A$, $U_B$, $U_C$, $U_D$ on the epipolar line 234 must have a corresponding point $W_A$, $W_B$, $W_C$, $V_1$ on the epipolar line 212. The set of points 240 represent points, e.g. $V_A$, $V_B$, $V_C$, $V_D$, in space that may intersect with an object O.

A 3D measuring device 100 is self-calibrating or auto-calibrating if, in the routine performance of measurements by the 3D measuring device 100, the measurement results are also used to obtain corrected calibration parameters (i.e. a corrected calibration). In an embodiment of the present invention, the first step to obtain corrected new calibration parameters is to detect inconsistencies in the positions of images of selected points on projection or image planes in relation to the positions expected based on epipolar constraints.

An example of such an inconsistency is shown in FIG. 14. A point 236 on the plane 230 intersects an object at the point 238. According to epipolar geometrical constraints, the point 238 should appear on the epipolar line 212 and specifically at the point 218. In this case, the actual point was observed at the position 216. In general, with only two planes 210, 230, all that is known is that, for a point 236 that falls on the epipolar line 234, a corresponding point should fall on the epipolar line 212. That the point 216 does not fall on the epipolar line 212 indicates that there is a problem with the calibration parameters, although whether the calibration parameter(s) at fault is an extrinsic parameter, intrinsic parameter, or operating parameter is difficult to say based on an observation of a single point 216.

FIG. 14 shows some errors that may be seen in extrinsic calibration parameters. One type of error that may be seen is in the baseline 208, not only the baseline distance B, but also the specific position of the perspective centers $O_1$, $O_2$. In other words in the coordinates of the perspective center points along the direction of the nominal baseline 208 (error 252) and in a direction perpendicular to the direction of the nominal baseline 208 (error 254). Another possible extrinsic error is in the angular orientation of unit $U_1$ or unit $U_2$. One way to characterize the orientation is in terms of a pitch angle 256 about an axis 255 and a yaw angle 258 about an axis 257. If the calibration parameters for the pitch and yaw angles of the planes 230 and 210 are incorrect, the points on the planes will not correspond to the expected positions based on epipolar geometrical constraints. Unit $U_1$ and unit $U_2$ may also have incorrect calibration parameters for the roll angle of the camera or projector. Such errors may be detected and corrected in an auto-calibration procedure as discussed further herein. The roll angle calibration parameter is sometimes considered to be an intrinsic calibration parameter rather than an extrinsic parameter.

If deviations are too large, difficulties in finding the correspondences of a point $X_0$ might occur in simultaneously solving the epipolar constraints. In an embodiment, the pattern X consists of a large number (e.g. 10,000) of spots with a low optical intensity and a smaller number (e.g. 1,000) of spots with a high optical intensity. With this variation in optical intensities, the 3D measuring device 100 may recognize objects having surfaces with high or low reflectance. If difficulties in finding the correspondences occur, it is possible to space the spots projected in the pattern X farther apart to reduce ambiguity in determining correspondences during the fourth process block. In the embodiment having the variation in optical intensities, the spots with the lower intensity, can be filtered out or at least be reduced by reducing the exposure times and/or reducing the total power of the projector 121. In this instance, only the spots with high optical intensity (which have a higher spacing) are visible on the cameras 111, 112. This reduces the ambiguities in determining correspondences.

For fully and correctly determining the calibration parameters, it is advantageous to use the whole volume around the 3D measuring device 100 for measurements, in particular to use the depth information for determining the extrinsic parameters. As an example, FIG. 19 shows (schematically), how the relative geometry of the two cameras 111 and 112 is verified. For this purpose, the two points $X_1$, $X_2$ are selected with a different distance to the 3D measuring device 100 (i.e. with a different depth). With each of the points $X_1$ or $X_2$ and the former calibration, it can be verified whether the cameras 111 and 112 still provide consistent results. If an inconsistency occurs due to a deviation of the relative distance or of the relative alignment of the two cameras 111 and 112, it is possible to distinguish between the two kinds of error with the two different distances. Due to the high mechanical and thermal stability of the carrying structure 102, thermal deformations of the 3D measuring device 100 or deformations thereof caused by a mechanical shock would be unusual, but may occur at the mounting means of the cameras 111, 112, 113 and of the projector 121 for example. A verification of the calibration after switching initiating operation of the 3D measuring device 100 and after long intervals in terms of time is sufficient in most cases, such as after the acquisition of twenty to one hundred frames for example.

The calibration parameters may be amended according to the determined deviations Δ, for example deviations detected by means of the selected points $X_0$, $X_1$ or $X_2$ may be compensated. Using the redundancies in measuring the 3D coordinates of the points, new calibration parameters may be determined. For example, the calibration parameters may be changed (corrected) according to an optimization strategy until the deviations Δ are minimized or are less than a predetermined threshold. The new calibration parameters are compared with the currently used calibration parameters and replace them, if appropriate, i.e. if the deviation between the (corrected) new calibration parameters and the currently used calibration parameters exceeds a given threshold. Thus the calibration is corrected. It should be appreciated that many of the deviations due to mechanical issues are single events and may be fixed by a permanent correction of the calibration parameters, in particular the extrinsic or intrinsic parameters.

Errors related to deviations in the operating parameters of the projector 121 may be determined much faster than deviations in the extrinsic parameters or intrinsic parameters. In an embodiment, an operating parameter to be checked is the wavelength of the light source 121a. The wavelength can change due to the warming up of the light source 121a or changes in the pump current for example. An embodiment is shown in FIG. 20 (schematically). The pattern X generated by the diffractive element 124 changes in scale with the change in wavelength. As shown in the error field of FIG. 21, in the center of the pattern X, such as the position with the zeroth order of diffraction of the laser beam, there is no deviation in the position of the central pattern element if the wavelength changes. The deviations Δ appear at locations with higher orders of diffraction, such as in the more peripheral pattern elements for example, as a shift in position. Such a shift in position of individual diffraction of the pattern elements can be recognized with a single camera 111 or 112.

If position and alignment of the 3D measuring device 100 (and consequently of the projector 121) relative to the object O remain unchanged, a selected point on the object O moves from a point with theoretical coordinates $X_1$ (i.e. the coordinates determined by means of the latest used calibration) in the 3D scan to a point with actual coordinates $X_2$ which differ therefrom. In other words an expected point $X_1$ becomes an actual point $X_2$. Using the depth information, as described above in relation to FIG. 19, the actual 3D coordinates of the selected point $X_2$ may be determined from the frames of each single shot. In the event of a deviation Δ of the actual coordinates of point $X_2$ from the theoretical coordinates $X_1$ of the selected point, a change of the wavelength is detected. The new wavelength is determined from the size of the deviation Δ. In another embodiment, two frames captured at different times are compared to detect a deviation of the actual coordinates of the selected point $X_2$ from theoretical coordinates $X_1$.

If a change of the wavelength is observed, actions to counter the change can be taken or calibration can be corrected, if appropriate. Correction of calibration can be made by replacing the wavelength of the calibration by the new wavelength detected. In other words, the calibration parameter of the wavelength is changed. Actions to counter the change may include, for example, cooling the laser (if the light source 121a is a laser) or reducing the pump current, to return the wavelength to its unchanged (i.e. original) value. By applying feedback in a control loop to the pump current or to the laser cooling, the wavelength of the laser can be stabilized.

Some light sources 121a may drift in wavelength when no control system is used. In these embodiments, broad optical bandpass filters might be used to cover the range of possible wavelengths. However, broad optical filters may pass more undesired ambient light, which may be an issue when working outdoors. Therefore in some applications a wavelength control system is desirable. It should be appreciated that the embodiments described herein of directly observing a change in wavelength provides advantages in simplifying a wavelength control systems, which ordinarily require stabilization of both temperature and current.

Some types of semiconductor lasers such as Fabry Perot (FP) lasers emit a single spatial mode but may support multiple longitudinal modes, where each longitudinal mode having a slightly different frequency. In some cases, current may be adjusted to switch between operation with single or multiple longitudinal modes. The number of longitudinal modes of the laser may be an operating parameter of the projector 121. Ordinarily, one single wavelength is desired as this produces a single well defined pattern X. If two wavelengths are produced by the laser, the second wavelength produces a type of shadow in the desired pattern X. The result can be described with reference to FIG. 20. Depending on the difference in the wavelengths of the multiple longitudinal modes, a circular point may become an elliptical or a barbell shape or a point pair $X_1$, $X_2$. These deviations can be detected by applying image processing to the received pattern X. If multiple modes are observed, pump current or cooling may be adjusted to reduce the number of longitudinal modes to one.

Deviations in the intrinsic parameters of the cameras 111 and 112, for example focal length, may in some cases be automatically recognized and be compensated for. In other instances, deviations in intrinsic parameters may arise, not from thermal or mechanical causes, but due to deliberate actions by the operator or through the operation of the 3D measuring device 100. These actions may include a change in the optics of the cameras 111, 112, or by focusing or zooming the cameras 111, 112 for example.

An additional possibility of verifying calibration results is to combine the 3D scan data based on triangulation with 2D images captured by the 2D camera 113. These 2D images normally comprise colors and other features of the object O. In one embodiment, the projector 121 and the two cameras 111 and 112 are synchronized with the camera 113 to capture frames of the object O synchronously. In this embodiment, the projector 121 projects infrared light received by the cameras 111, 112 through infrared filters, while the camera 113 receives an image of the object O though a filter that blocks infrared light wavelengths and therefore pattern X. Thus the camera 113 receives a clear image of the features of the object O. By comparing object features observed by the cameras 111, 112 to those observed by the camera 113, errors in the calibration parameters of the triangulation system that includes elements 111, 112, and 121 may be determined. The method used to determine errors in the calibration parameters is similar to that described here, such as the 2D camera 113 being regarded as one of the units $U_1$, U$_2$ for example. Correspondences are detected in the captured frames and 3D-coordinates of the selected object features are determined. Due to the redundancies in determining the 3D coordinates, new calibration parameters may be determined, which are compared with the currently used calibration parameters. If the difference between the current calibration parameters and the new calibration parameters exceeds a threshold, the new calibration parameters replace the currently used ones.

In another embodiment, the light received by camera 113 is not filtered to exclude infrared light. Rather, in this embodiment, the camera 113 capable of detecting and acquiring an image of the pattern X if present on the object O. The camera 113 may then operate in either of two modes. In a first mode, the camera 113 collects images temporally in between pulsed projections of the pattern X by the projector 121. In this mode, the camera 113 captures images of features that may be compared to the features calculated by the triangulation system that includes 111, 112, and 121 to determine errors in the calibration parameters. In a second mode, the camera 113 acquires images when the pattern X is projected onto the object O. In this case, errors in the relative alignment of the six degrees-of-freedom of the camera 113 to the triangulation elements 111, 112, and 121 may be determined.

For the case in which the images acquired by the 2D camera 113 are received between image frames of cameras 111, 112, an interpolation of 3D and 2D coordinate data may be made to account for the interleaving of images. Such interpolations may be mathematical. In one embodiment the interpolations may be based at least in part on a Kalman filter calculation. In an embodiment, the 3D measuring device 100 is provided with an inertial measurement unit (or another position tracking device). The inertial measurement unit measures accelerations in the three directions of space with three sensors (accelerometers) and, with three further sensors (gyroscopes), the angular velocities around three coordinate axes. Movements can thus be measured on short time scales. These movement measurements allow for a compensating offset in terms of time between distance measured by the projector and cameras 111, 112 and the image acquired by the 2D camera 113. This compensating offset allows for the combination of the data.

Figure 7:
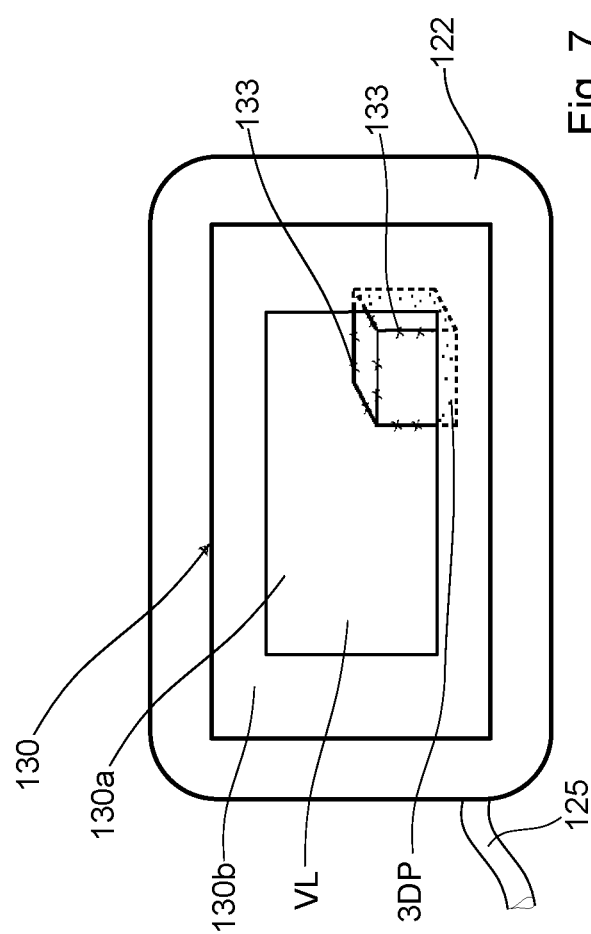
FIG. 7 shows a representation of the control and evaluation device with display.
Figure 8:
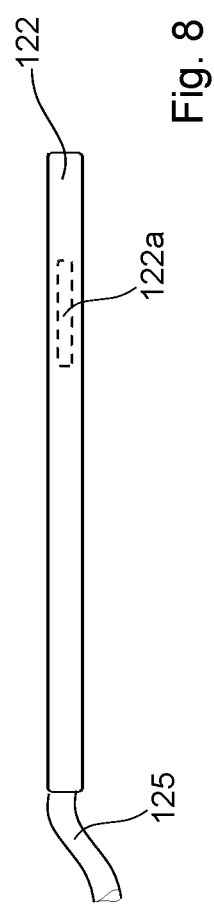
FIG. 8 shows a representation of the control and evaluation device of FIG. 7 from a right side.

One embodiment of the display 130 shown in FIG. 7 illustrates a subdivided image or subdivided screen. In this embodiment, the display 130 is divided into a first display part 130a and a second display part 130b. In the present embodiment, the first display part 130a is a (rectangular) central part of the display 130, and the second display part 130b is a peripheral area around the first display part 130a. In another embodiment, the two display parts may be columns. In the illustrated embodiment, the first display part 130a is shown as having a rectangular shape, however this is for exemplary purposes and the claimed invention should not be so limited. In other embodiments, the first display part 130a may have other shapes, including but not limited to circular, square, trapezoid, trapezium, parallelogram, oval, triangular, or a polygon having any number of sides. In one embodiment, the shape of the first display part 130a is user defined or selectable.

In the first display part 130a the video live image VL is displayed, such as that captured by 2D camera 113 for example. In the second display part 130b, an image of the latest 3D scan (or a plurality of 3D scans that have been registered) is displayed as at least part of a view of the three-dimensional point cloud 3DP. The size of the first display part 130a may be variable, and the second display part 130b is arranged in the area between the first display part 130a and the border 131 of the display 130. As video live image VL changes, such as when the user moves the device 100, the image of the three-dimensional point cloud 3DP changes correspondingly to reflect the change in position and orientation of the device 100.

It should be appreciated that the placement of the image of the three-dimensional point cloud 3DP around the periphery of the video live image VL provides advantages in allowing the user to easily see where additional scanning may be required without taking their eyes off of the display 130. In addition it may be desirable for the user to determine if the computational alignment of the current camera position to the already acquired 3D data is within a desired specification. If the alignment is outside of specification, it would be noticed as discontinuities at the border between the image and the three-dimensional point cloud 3DP.

The image acquired by the camera 113 is a two-dimensional (2D) image of the scene. A 2D image that is rendered into a three-dimensional view will typically include a pin-cushion-shaped or barrel-shaped distortion depending on the type of optical lens used in the camera. Generally, where the field of view (FOV) of the camera 113 is small (e.g. about 40 degrees), the distortion is not readily apparent to the user. Similarly, the image of the three-dimensional point cloud data may appear distorted depending on how the image is processed for the display. The point cloud data 3DP may be viewed as a planar view where the image is obtained in the native coordinate system of the scanner (e.g. a spherical coordinate system) and mapped onto a plane. In a planar view, straight lines appear to be curved. Further, the image near the center-top and center-bottom edges (e.g. the poles) may be distorted relative to a line extending along the midpoint of the image (e.g. the equator). Further, there may also be distortions created by trying to represent a spherical surface on a rectangular grid (similar to the Mercator projection problem).

It should be appreciated that it is desired to have the images within the first display part 130a appear to be similar to that in the second display part 130b to provide a continuous and seamless image experience for the user. If the image of three-dimensional point cloud 3DP is significantly distorted, it may make it difficult for the user to determine which areas could use additional scanning. Since the planar image of the point cloud data 3DP could be distorted relative to the 2D camera image, one or more processing steps may be performed on the image generated from the point cloud data 3DP. In one embodiment, the field of view (FOV) of the second display part 130b is limited so that only the central portion of the planar image is shown. In other words, the image is truncated or cropped to remove the highly distorted portions of the image. Where the FOV is small (e.g. less 120 degrees), the distortion is limited and the planar view of the point cloud data 3DP will appear as desired to the user. In one embodiment, the planar view is processed to scale and shift the planar image to provide to match the camera 113 image in the first display part 130a.

In another embodiment, the three-dimensional point cloud data 3DP is processed to generate a panoramic image. As used herein, the term panoramic refers to a display in which angular movement is possible about a point in space (generally the location of the user). A panoramic view does not incur the distortions at the poles as is the case with a planar view. The panoramic view may be a spherical panorama that includes 360 degrees in the azimuth direction and +/−45 degrees ion the zenith. In one embodiment the spherical panoramic view may be only a portion of a sphere.

In another embodiment, the point cloud data 3DP may be processed to generate a 3D display. A 3D display refers to a display in which provision is made to enable not only rotation about a fixed point, but also translational movement from point to point in space. This provides advantages in allowing the user to move about the environment and provide a continuous and seamless display between the first display part 130a and the second display part 130b.

In one embodiment, the video live image VL in the first display part 130a and the image of the three-dimensional point cloud 3DP in the second display part 130b match together seamlessly and continuously (with respect to the displayed contents). A part of the three-dimensional point cloud 3DP is first selected (by the control and evaluation device 122) in such a way, as it is regarded from the perspective of the 2D camera 113 or at least from a position aligned with the 2D camera 113. Then, the selected part of the three-dimensional point cloud 3DP is selected in such a way that it adjoins continuously the video live image VL. In other words, the displayed image of the three-dimensional point cloud 3DP becomes a continuation of the video live image VL for the areas beyond the field of view of the 2D camera 113 on the left, on the right, top and bottom relative to the field of view of the 2D camera). As discussed above, the selected portion of the three-dimensional point cloud 3DP may be processed to reduce or eliminate distortions. In other embodiments, the representation may correspond to the representation of a fish-eye lens, but preferably it is undistorted. The part of the three-dimensional point cloud 3DP which is located in the area occupied by the first display part 130a, in other words the portion beneath or hidden by the video live image VL, is not displayed.

It should be appreciated that the density of the points in the three-dimensional point cloud 3DP in the area where the first display part 130a is located will not be visible to the user. Normally, the video live image VL is displayed using the natural coloring. However, in order to indicate the density of the points in the area covered/behind by the video live image VL, the coloring of the video live image VL may be changed artificially such as by overlaying for example. In this embodiment, the artificial color (and, if appropriate, the intensity) used for representing the artificially colored video live image VL corresponds to the density of the points. For example, a green coloring to the video live image VL may indicate a (sufficiently) high density while a yellow coloring may be used to indicate a medium or low point density (e.g. areas which still the scan data can be improved). In another embodiment, the distant-depending precision of the data points could be displayed using this color-coding.

To support the registration of the 3D scans, flags or marks 133 (FIG. 7) may be inserted in the first display part 130a to indicate structures (i.e. possible targets) recognized by the control and evaluation device 122. The marks 133 may be a symbol, such as a small "x" or "+" for example. The recognizable structures can be points, corners, edges or textures of objects. The recognizable structures may be found by the latest 3D scan or the video live image VL being subjected to the beginning of the registering process (i.e. to the localization of targets). The use of the latest video live image VL provides advantages in that the registration process does not have to be performed as frequently. If the marks 133 have a high density, it is considered to be a successful registration of the 3D scans. If, however, a lower density of the marks 133 is recognized, additional 3D scans may be performed using a relatively slow movement of the 3D measuring device 100. By slowing the movement of the device 100 during the scan, additional or higher density points may be acquired. Correspondingly, the density of the marks 133 may be used as a qualitative measure for the success of the registration. Similarly, the density of the points of the three-dimensional point cloud 3DP may be used to indicate a successful scan. As discussed above, the density of points in the scan may be represented by the artificial coloring of the video live image VL.

The movement of the 3D measuring device 100 and processing of the captured frames may also be performed by a tracking function, i.e. the 3D measuring device 100 tracks the relative movement of its environment with the methods used during tracking. If tracking gets lost, for example, if the 3D measuring device 100 has been moved too fast, there is a simple possibility of reassuming tracking. In this embodiment, the video live image VL as it is provided by the 2D camera 113 and the last video still image from tracking provided by it may be represented adjacent to each other in a side by side arrangement on the display 130 for the user. The user may then move the 3D measuring device 100 until the two video images coincide.

Referring now to FIGS. 15-19 an embodiment will be described for controlling the 3D measuring device 100 based on movements or gestures of the device 100. These movements or gestures by the user can also be used for controlling the representation of the video image VL or of the three-dimensional point cloud 3DP. In an embodiment, these steps or gestures may be integrated into the method of measuring, such as following block 203 described in reference to FIG. 11. Generally, three steps are provided: a movement recognition step 311; a movement evaluation step 312; and a control step 314.

In the movement recognition step 311, the movement of the 3D measuring device 100 is recorded, such as during the registration that occurs in process block 203 for example. The movement evaluation step 312 determines the amount and the direction of speed or acceleration of the movement. This determination may also incorporate temporal aspects of the movement as well as the quality and quantity of the movement. In evaluating the quality, the movement may be compared with predetermined movements stored in memory. If a predetermined threshold value is exceeded (or not exceeded), then a defined movement is identified. The control step 313, the operation of the 3D measuring device 100 is changed based on the evaluated movement. It should be appreciated that all three steps 311, 312, 314 may be performed by either the control and evaluation device 122 or via an external computer coupled for communication (e.g. through a serial or network connection) to the control and evaluation device 122.

The control of the 3D measuring device 100 can influence on at least three categories of control, namely measuring (e.g. the measuring process with the acquisition of measured data), visualization (e.g. the preliminary evaluation of measured data and the representation thereof) and post-processing (e.g. the final evaluation of measured data). It should be appreciated that the 3D measuring device 100 may use gestures to control one of or a combination of these categories. Further, the control functions performed in response to the gesture may be context sensitive. For example, during post-processing, the control step 313 may provide only storing of the result of the movement evaluation step 312 otherwise it will be carried out after the measuring process is finished. The three control categories may interact with any of the components, subcomponents or auxiliary components, such as but not limited to the 3D measuring device 100, the control and evaluation device 122, the display 130 or a computing device connected locally or remotely (such as via a serial or network connection).

Figure 16:
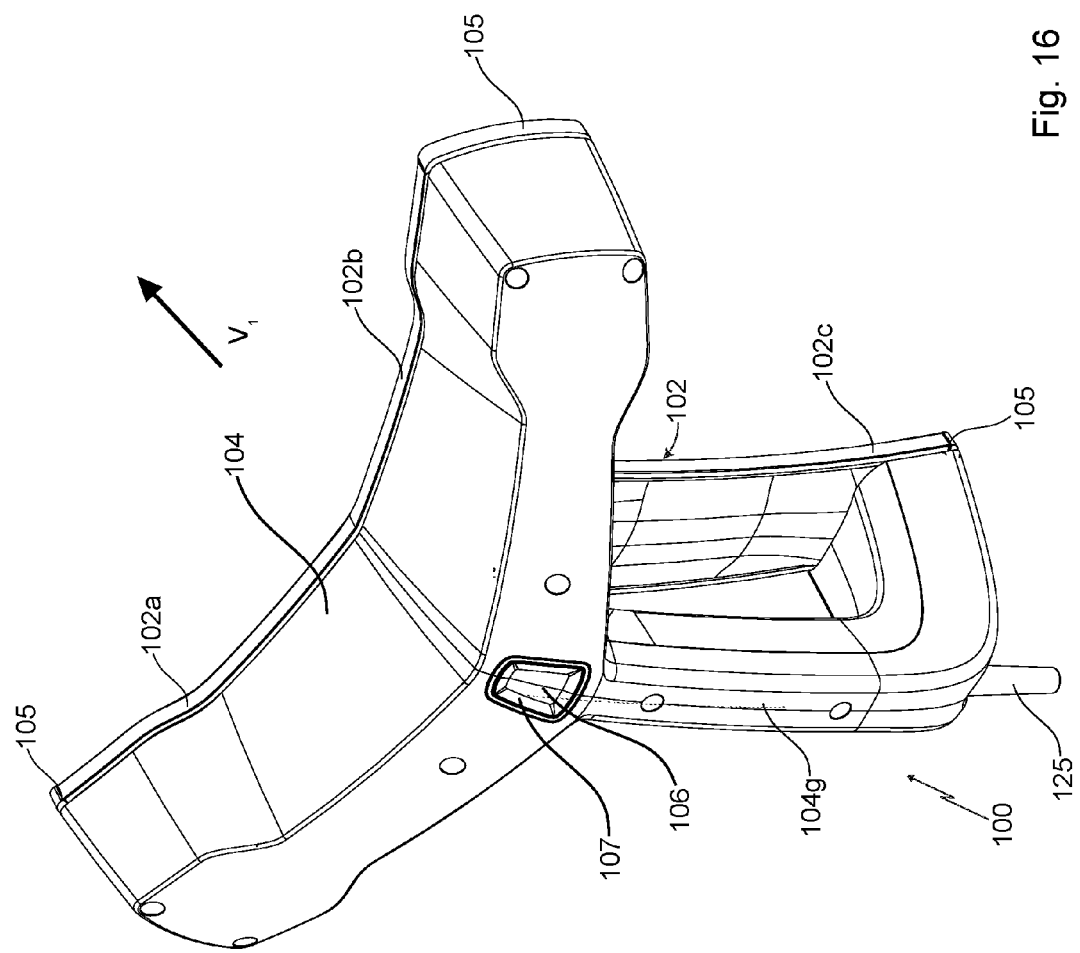
FIG. 16 shows a first group of movements with the 3D measuring device.

The gestures and the evaluation of movement can be subdivided into three groups represented in FIGS. 16-18. It should be appreciated that while embodiments herein describe the movements as being discrete motions, these movements may also be combined or performed in series. In one embodiment the user interface may be selected based on the motion or gesture, such as selecting the configuration of the control knob 106.

Referring now to FIG. 16 the first group of gestures or movements is illustrated. In this mode of operation, the 3D measurement device 100 is moved in the direction $V_1$. The motion V1 is measured both in terms of velocity and acceleration. Depending on the direction, velocity or acceleration of the motion, different control functions that change the measurements being acquired or visualization of the data on display 130 for example. If a measurement function is controlled, a standstill of movement of the 3D measuring device 100 may be used to capture a sequence of images of one or multiple cameras 111, 112, 113 with a low dynamic range, but with different exposure times of the cameras 111, 112, 113. In another embodiment, the standstill gesture may cause different illumination intensity to be emitted from light source 121a or LEDs 114. In still another embodiment, the standstill movement may cause a different illumination time (pulse length) from light source 121a within the sequence and to acquire an image using high dynamic range (HDR) techniques. As used herein, the term "standstill" means to stop moving the 3D measuring device 100, in other words to have zero velocity in any direction. In an embodiment, the term "standstill" includes when the user reduces the velocity of the 3D measurement device 100 to less than a threshold.

In one embodiment, the scale of representation of the video image VL and/or of the three-dimensional point cloud 3DP on the display 130 may depend on the speed and/or acceleration of the movement of the 3D measuring device 100. The term "scale" is defined as the ratio between the size (either linear dimension or area) of the first display part 130a and the size of the complete display 130, being denoted as a percentage.

A small field of view of the 2D camera 113 is assigned to a small scale. In the present embodiment with a subdivided display 130 with a central first display part 130a showing the video live image VL, this first display part 130a then may be of smaller size than in the standard case, and the second display part 130b (about the periphery of the first display part 130a) shows a bigger part of the three-dimensional point cloud 3DP. A larger field of view is assigned to a large scale. In one embodiment, the video live image VL may fill the whole display 130.

In the event of high speeds of movement of the 3D measuring device 100 are detected, the scale of the representation may be configured smaller than with low speeds and vice versa. Similarly, this may apply to accelerations of the movement of the 3D measuring device 100. For example, the scale of the displayed image is reduced in the case of positive accelerations, and the scale is increased in the case of negative accelerations. The scale may also depend on a component of the speed and/or acceleration of the movement of the 3D measuring device 100, for example on a component which is arranged perpendicular or parallel to the alignment of the 3D measuring device 100. If the scale is determined based on a component of the movement, parallel to the alignment (i.e. in the direction of the alignment), the scale can also be made dependent on the change of an average distance to objects O from the 3D measuring device 100.

In some embodiments, the change of the scale due to movement, a standstill of the movement of the 3D measuring device 100 or a threshold speed of movement value not being achieved can be used to record a sequence of still images of the camera 113 with a low dynamic range. These images may be captured at low dynamic range but with different exposure times or illumination intensities within the sequence to generate a high dynamic range image therefrom.

Referring now to FIG. 17, the second group of movements comprises the gestures or motions as indicated by arrow $V_2$. In this embodiment, the user carries out certain small movements with the 3D measuring device 100 such as a circular movement. This circular movement may be within an area of space having a radius of at least approximately an arm's length of the user. It should be appreciated that while FIG. 17 illustrates the motion $V_2$ as being about an axis extending normal to the front of the 3D measuring device 100, this is for exemplary purposes and the claimed invention should not be so limited. In other embodiments, the axis about which the rotation takes place could be different, such as an axis extending from the sides of the device 100 or vertically through the center of the device 100. The evaluation of the gestures $V_2$ takes place preferably in terms of quality, by comparing the movements with stored types of movement and by thus identifying the gestures $v_2$.

By means of the gestures $V_2$, either alone or in combination with gesture $V_1$, the user can activate all three categories of control, such as the acquisition of data and operation of the 3D measuring device 100 or display 130. The user can switch between discrete states or adjust values step by step or continuously.

In one embodiment, the gestures $V_2$ (either alone or in combination with gestures $V_1$) may be used to control functions of the 3D measurement device 100. These control functions include, but are not limited to: selecting the measurement method (e.g. between photogrammetry, pattern detection, fringe projection and combined methods); selecting the properties of acquisition (e.g. power of the projector 121, exposure time, object distances, pattern or point density); and switching additional measurement properties on and off (e.g. 3D recognition of contours or a flash).

In an embodiment, the gestures $V_2$ (either alone or in combination with gestures $V_1$) may be used to control visualization functions of the display 130 or an external computing device. These visualization functions include, but are not limited to: selecting the user interface (e.g. the button arrangement, selection between 2D, 3D and combined view during scanning); selecting the representation (e.g. point size, viewing angle, kind of projection such as orthographic or perspective, or a map view); selecting navigation (e.g. object-centered or camera-centered, whether zooming is allowed); using the 3D measuring device 100 as a mouse with six degrees of freedom (x-direction, y-direction, z-direction, yaw angle, roll angle and pitch angle) for navigating through the common coordinate system with the three-dimensional point cloud 3DP; and interacting with the representation on the display 130 and with further user interfaces in the manner of a mouse (e.g. shifting the contents of the display 130 aside with a movement)

In an embodiment, the gestures $V_2$ (either alone or in combination with gestures $V_1$) may be used to control post-processing functions of the display 130 or an external computing device. These post-processing functions include, but are not limited to: setting marks (marking points of interest, such as by encircling the point); setting a viewpoint or a rotation point into the center of a volume of interest; defining a location for the navigation through the common coordinate system with the three-dimensional point cloud 3DP (e.g. by a gesture with a change of the pitch angle, corresponding to clicking with a mouse key); and defining the (approximate) gravitational direction (z-direction).

In some embodiments, the direction of gravity may be defined at the beginning of the registration process by a defined movement of the 3D measuring device 100. This defined movement is carried out by the user by moving the device 100 in a vertical upward and downward movement over a predetermined distance, such as 20 cm for example. In other embodiments, the direction of gravity may be determined from a set of statistics of all movements during the registration process. A plane may be averaged from the coordinates of the positions taken by the device 100 while recording process along a path of movement through space. It is assumed that the averaged plane is located horizontally in space, meaning that the direction of gravity is perpendicular to it. As a result, the use of inclinometer 119 for determining the direction of gravity may be avoided.

Referring now to FIG. 18, a third group of movements comprises the gestures or motions as indicated by arrow $V_3$. It should be appreciated that the motion $V_3$ is a path through space. In this group of gestures may be evaluated by determining the coordinates of the positions of the 3D measuring device 100, such as during the measuring process. The evaluation of the path of motion $V_3$ may be used to determine the kind of scene and, if appropriate, to offer different representations or operating functions. In an embodiment, properties of the path of motion $V_3$ and of the alignment of the 3D measuring device 100 are evaluated and compared with predetermined motions. It should be appreciated this evaluation may be statistically based, in an embodiment the comparison determines which of the predetermined motions has the highest probability of corresponding to the path of motion $V_3$. In one embodiment, function selected from the evaluation of the motion $V_3$ is based on the probability of the path of motion $V_3$ being greater than a threshold. In an embodiment, the gestures $V_2$ may be distinguished by the change of position of the 3D measuring device 100 in space during a movement between two standstill gestures.

In one embodiment, the path of motion $V_3$ may also be used for determining the kind of scene and, if appropriate, to offer different representations or operating possibilities. A path of movement around a center location (with an alignment of the 3D measuring device 100 oriented towards the interior), suggests an image of a single object O (object-centered image). Similarly, a path of movement that orients the device 100 towards the outside (and particularly longer straight sections of the path of movements) makes reference to an image of rooms. Thus, where it is determined that a room is being scanned, an image of a floor plan (top view) may be inserted into the display 130.

In one embodiment, the gestures $V_3$ (either alone or in combination with gestures $V_1$ and $V_2$) may be used to control measurement functions of the 3D measurement device 100. These functions include, but are not limited to: selecting the measurement method (as indicated for $V_2$), for example by virtue of the distance of the captured objects to the path of motion $V_3$; and selecting data for tracking or registration.

In one embodiment, the gestures $V_3$ (either alone or in combination with gestures $V_1$ and $V_2$) may be used to control visualization functions of the 3D measurement device 100. These functions include, but are not limited to: selecting the representation by virtue of the measurement, particularly with regard to zoom and orientation; defining the volume of interest with respect to the background; displaying a floor plan (top view) as a map on the display 130; defining the walls of the room into a volume of interest (e.g. when there is no floor plan); and selecting a user interface.

In one embodiment, the gestures $V_3$ (either alone or in combination with gestures $V_1$ and $V_2$) may be used to control post-processing functions of the 3D measurement device 100. These functions include, but are not limited to: detecting volumes of interest; selecting between the features of the volumes of interest; selecting between different options of post-processing (e.g. processing only volumes of interest); filling the gaps on object surfaces in the detected volumes of interest (video meshing, gap filling), as well as supporting interpolations and joining; detecting the position of the floor from the z-coordinates of the path of motion $V_3$ (e.g. defining that the z-coordinates on average are located on a horizontal plane, and limiting navigation to this plane); detecting a change of floors from the z-coordinates of the path of motion $V_3$; when a change in floor is detected, d separating the floors; and determining the absolute position of the floor (e.g. when the 3D measuring device includes an altimeter).

It should be appreciated that the gestures may be combined together to assist the user in controlling the functionality of the 3D measuring device 100. For example, by evaluating the speed of the motion $V_1$, certain user interface elements (e.g. buttons, sliders, text boxes) may appear on display 130. These user interface elements may then be activated by the motion of a gesture $V_2$.

In one embodiment, the rule of correspondence may be defined that correlates the gesture with a control function, such as the gestures and control functions described herein. The rule of correspondence may be any suitable means for correlating data, such as a look-up table or a database for example. In the exemplary embodiment, the rule of correspondence is stored in memory and retrievable by the control and evaluation device for determining a gesture based on velocity, acceleration, path of motion, direction of motion or type of motion for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for optically scanning and measuring an environment, the method comprising:
    emitting a light pattern onto an object from a projector of a three-dimensional (3D) measurement device having a plurality of cameras and the projector;
    storing, in a memory of a control and evaluation unit operably coupled to the plurality of cameras and the projector, a correspondence between each of a plurality of control functions for the 3D measurement device and each of a plurality of gestures, each gesture being a movement of the 3D measurements device;

recording a plurality of images of the light pattern on the object with the plurality of cameras at one or more points in time;

producing a 3D scan of the object based at least in part on the recorded plurality of images; and performing a control function at the 3D measurement device based on movements of the 3D measurement device, wherein the movements of the 3D measurement device comprise gestures by a user of the 3D measurement device in moving the 3D measurement device to various spatial positions;

wherein controlling the 3D measurement device based on the movements of the 3D measurement device comprises:

recognizing and recording the movements of the 3D measurement device;

evaluating the movements of the 3D measurement device by determining an amount and a direction of each of the movements of the 3D measurement device and by determining a speed and/or an acceleration of each of the movements of the 3D measurement device; and determining the gesture based at least in part on the movements of the 3D measurement device; and performing the control function of the 3D measurement device based at least in part on the determined gesture.

2. The method of claim 1 wherein the control and evaluation unit is integrated with the 3D measurement device.

3. The method of claim 1 wherein the control and evaluation unit is separate and apart from the 3D measurement device, further comprising communicating between the control and evaluation unit and the 3D measurement device.

4. The method of claim 1, wherein the plurality of cameras comprises first and second monochrome cameras.

5. The method of claim 1, wherein the plurality of cameras comprises first and second monochrome cameras, and a color camera.

6. The method of claim 1 further comprising showing visual information at a display device integrated with the 3D measurement device.

7. The method of claim 1 further comprising showing visual information at a display device separate and apart from the 3D measurement device, and communicating between the display device and the 3D measurement device.

8. The method of claim 1 wherein controlling the 3D measurement device based on movements of the 3D measurement device comprises controlling one or more categories of control of the 3D measurement device.

9. The method of claim 8 wherein the one or more categories of control of the 3D measurement device comprise measuring, visualizing and post-processing.

10. The method of claim 9 wherein measuring comprises acquiring data with respect to the object.

11. The method of claim 9 wherein visualizing comprises evaluating data acquired with respect to the object, wherein the data acquired with respect to the object is displayed visually on the display device.

12. The method of claim 9 wherein post-processing comprises a final evaluation of data acquired with respect to the object.

13. The method of claim 1 wherein the gestures by a user of the 3D measurement device in moving the 3D measurement device to various spatial positions comprise a plurality of different movements of the 3D measurement device.

14. The method of claim 13 wherein the plurality of different movements of the 3D measurement device include a linear movement, a circular movement, and an irregular movement.

15. The method of claim 13 wherein two or more of the plurality of different movements of the 3D measurement device may be performed sequentially.

16. The method of claim 1 further comprising providing visual information in the form of still images at a display device.

17. The method of claim 1 further comprising providing visual information in the form of video images at a display device.

18. The method of claim 1 further comprising providing visual information in the form of both still images and video images at a display device.

19. The method of claim 1 further comprising providing visual information in the form of a 3D point cloud of data with respect to the object at a display device.

20. The method of claim 19 wherein the 3D point cloud of data is provided simultaneously with video.

* * * * *